United States Patent [19]
Kawasumi et al.

[11] Patent Number: 5,645,758
[45] Date of Patent: Jul. 8, 1997

[54] LIQUID CRYSTAL COMPOSITION, LIQUID CRYSTAL DEVICE USING THE SAME, LIGHT CONTROLLING ELEMENT, RECORDING MEDIUM, AND LIGHT SHUTTER

[75] Inventors: Masaya Kawasumi; Hisato Takeuchi; Arimitsu Usuki; Akane Okada, all of Aichi, Japan

[73] Assignee: Kabushiki Kaisha Toyota Chuo Kenkyusho, Aichi-ken, Japan

[21] Appl. No.: 421,407

[22] Filed: Apr. 13, 1995

[30] Foreign Application Priority Data

Apr. 14, 1994 [JP] Japan .................................. 6-102208
May 19, 1994 [JP] Japan .................................. 6-131180
Jun. 24, 1994 [JP] Japan .................................. 6-166313
Jun. 24, 1994 [JP] Japan .................................. 6-166314

[51] Int. Cl.$^6$ ..................... C09K 19/52; C09K 19/54; G02F 1/13
[52] U.S. Cl. ...................... 252/299.01; 252/299.5; 428/1; 349/89; 349/117
[58] Field of Search ........................ 252/299.01, 299.5; 359/51, 52, 73; 428/1

[56] References Cited

U.S. PATENT DOCUMENTS

| | | | |
|---|---|---|---|
| 5,139,771 | 8/1992 | Gerstein | 424/63 |
| 5,229,451 | 7/1993 | Carter et al. | 524/493 |
| 5,430,566 | 7/1995 | Sakaya et al. | 359/73 |

FOREIGN PATENT DOCUMENTS

| | | |
|---|---|---|
| 0 480 415 A2 | 4/1992 | Germany . |
| 3-52843 | 8/1991 | Japan . |
| 63-501512 | 6/1993 | Japan . |

OTHER PUBLICATIONS

Kurihara et al., "Phtochemically Induced Isothermal Phase Transition in Liquid Crystals. Effect of Interaction of Photoresponse Molecules with Matrix Mesogens", Mol. Cryst. Liq. Cryst. 1990, vol. 178, pp. 133–142.

Tisato Kajiyama et al, "Aggregation States and Bistable Light Switching of (Liquid Crystalline Polymer)/(Low Molecular Weight Liquid Crystal) Mixture Systems", Chemistry Letters, pp. 817–820 (1989).

Akio Sasaki, "Liquid–Crystal Termo–Optic Effects and Two New Information Display Devices", Journal of Applied Physics, vol. 45, pp. 4356–4359 (Oct. 10, 1994).

Akio Sasaki et al, "Thermally Addressed Liquid–Crystal Display for Dynamic Figures", IEEE Transactions on Electron Devices, pp. 805–805 (Sep. 1975).

Primary Examiner—Shean C. Wu
Attorney, Agent, or Firm—Oblon, Spivak, McClelland, Maier & Neustadt, P.C.

[57] ABSTRACT

A liquid crystal composition comprising a liquid crystal and a second substance dispersed therein, the second substance having affinity for the liquid crystal and being composed of particles having a particle size and an aspect ratio of a predetermined value or greater, and a liquid crystal composition comprising a liquid crystal containing electric field sensitive liquid crystal molecules having a positive dielectric anisotropy as the principal component and flat plate-shaped particles having affinity for the liquid crystal being dispersed therein at such a degree of density suitable for effectively forming liquid crystal domains. Also described are a liquid crystal device using the same, a light-controlling element, a recording medium, and a light shutter.

12 Claims, 37 Drawing Sheets

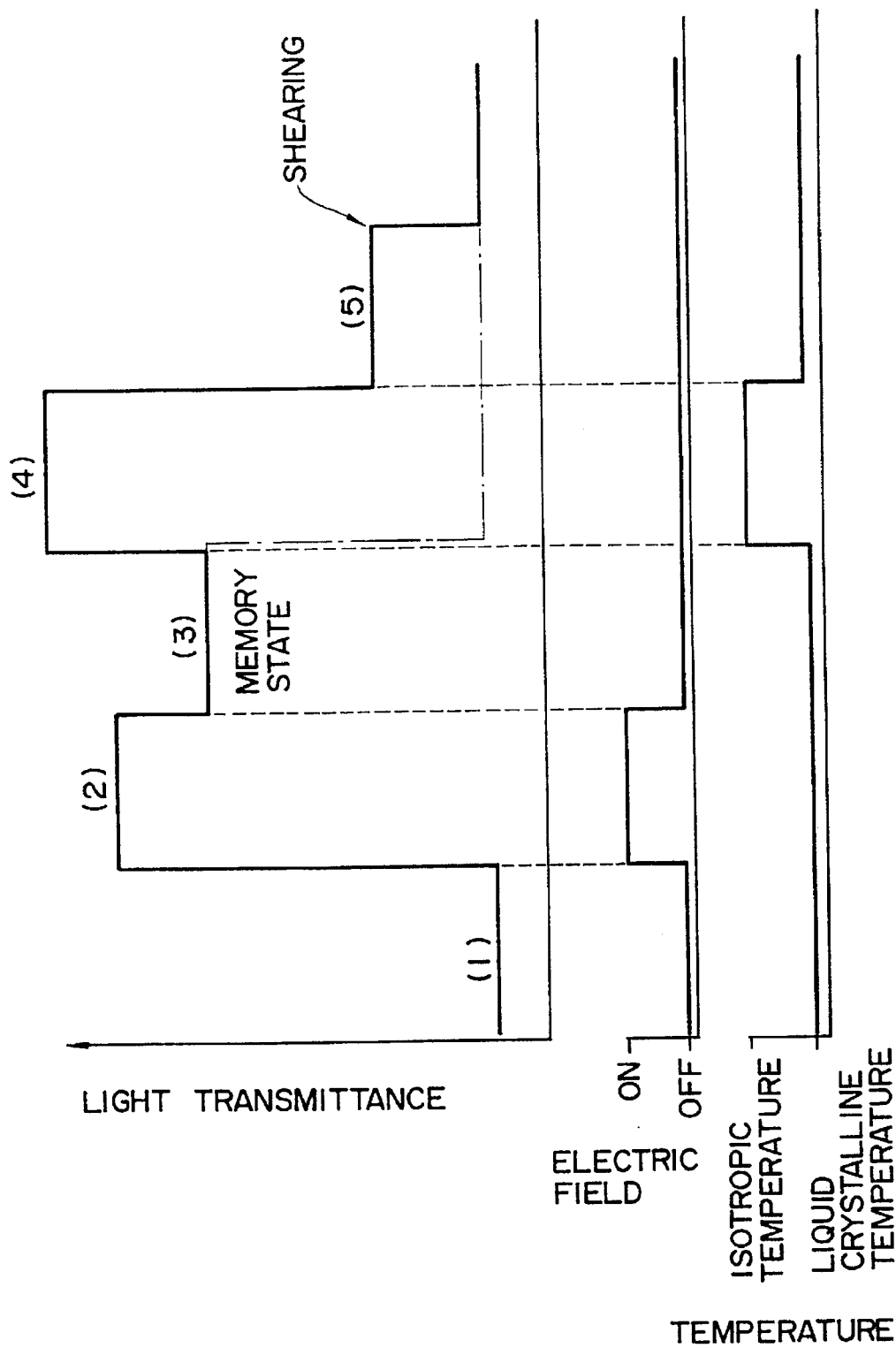

ELECTRIC FIELD

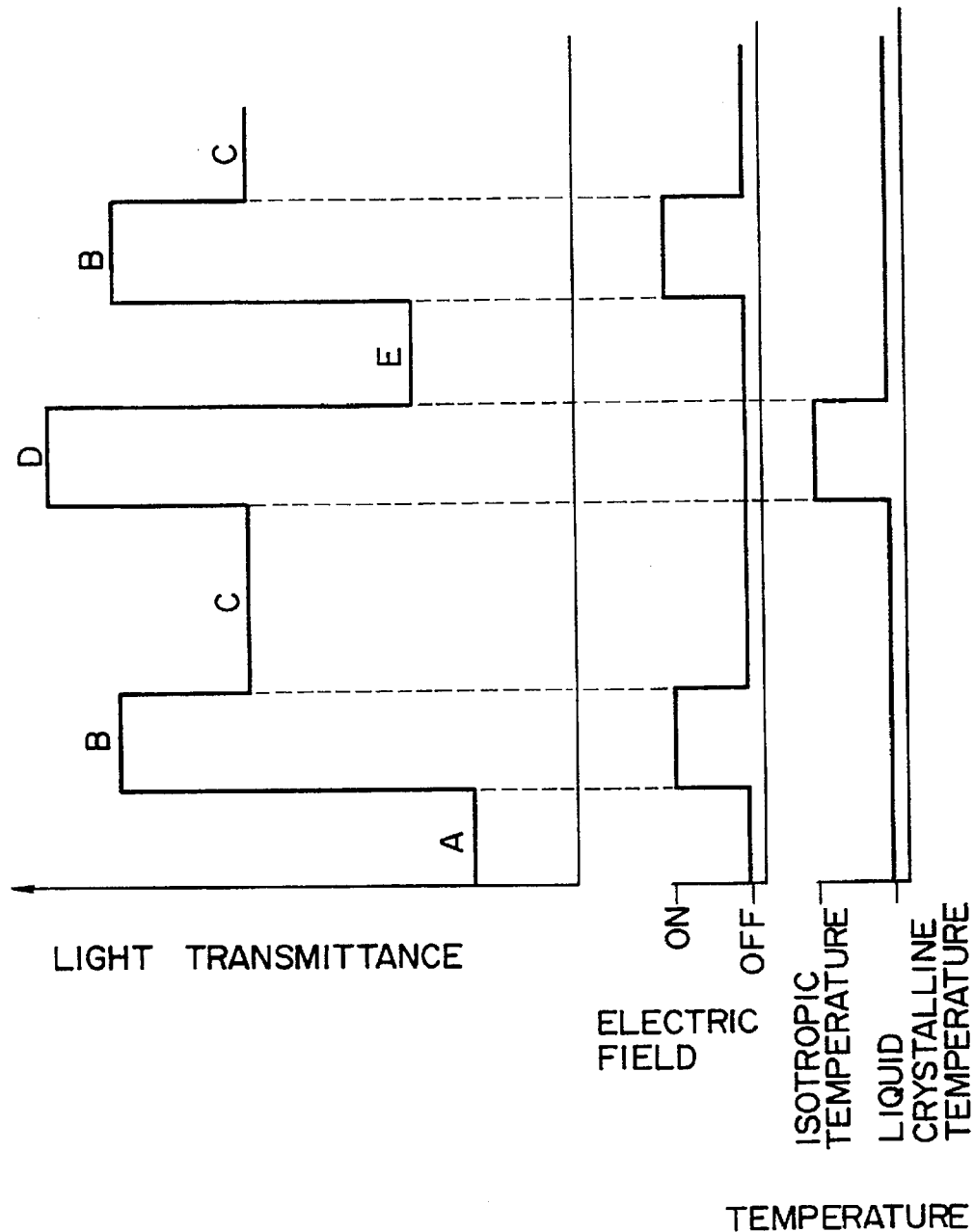

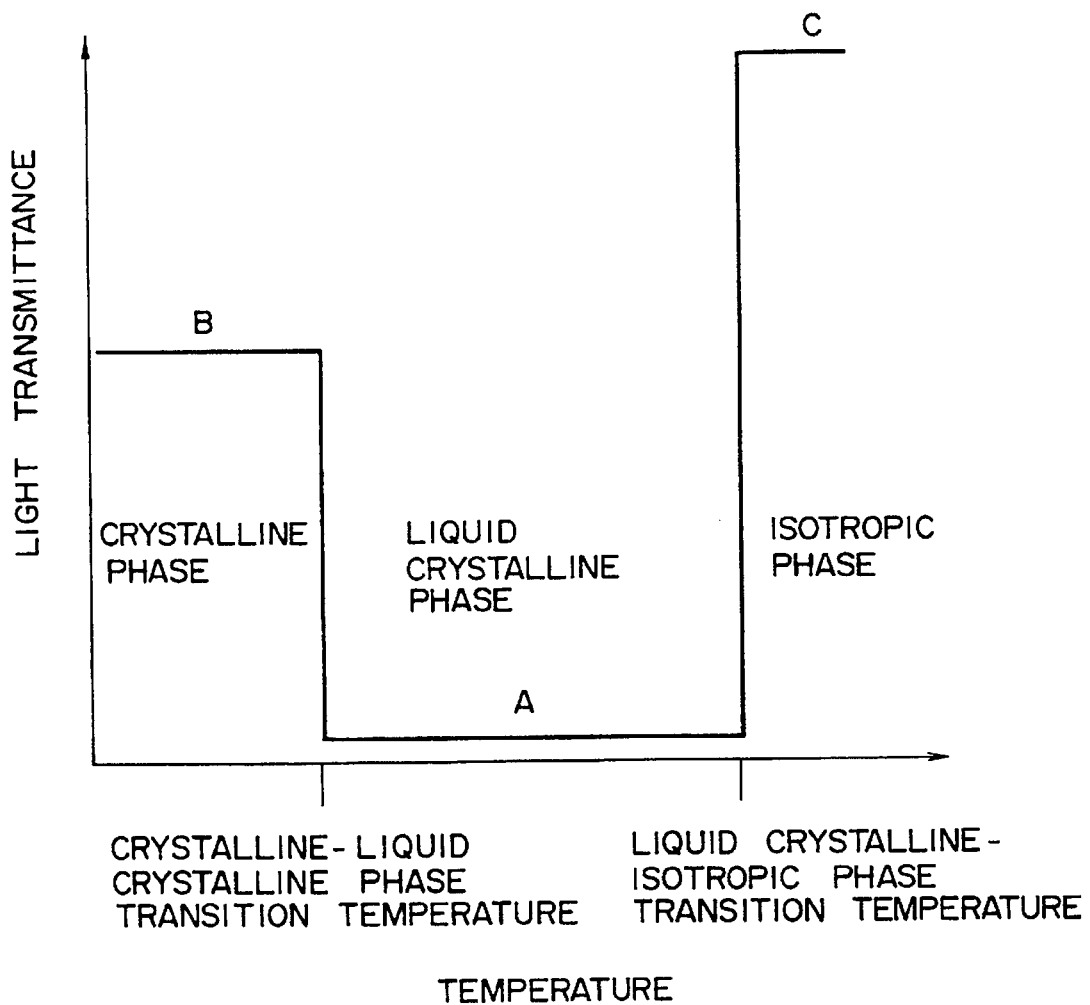

F I G. 64
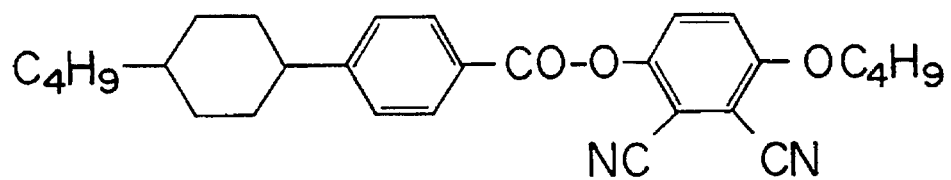
F I G. 65
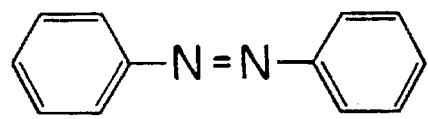
F I G. 66
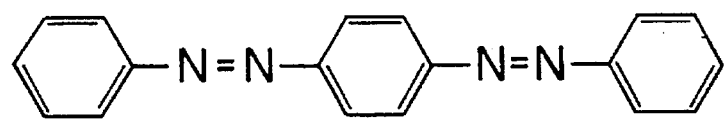
F I G. 67
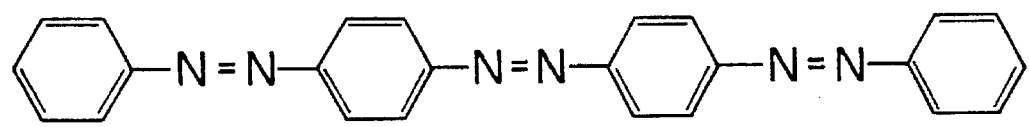

F I G. 91
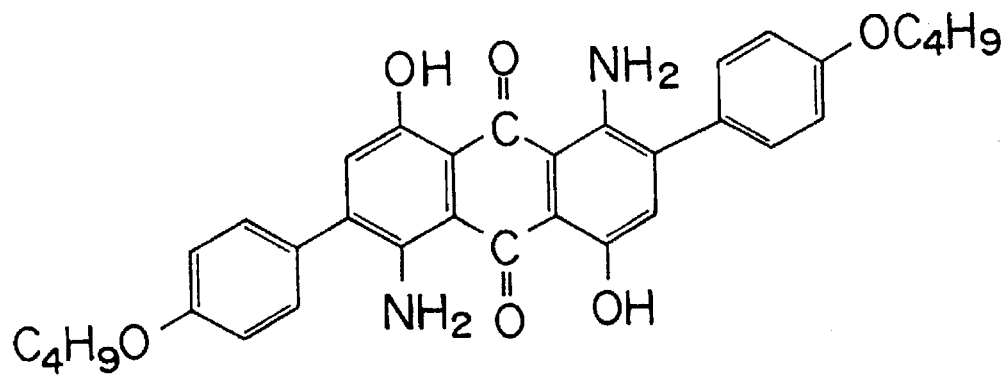
F I G. 92
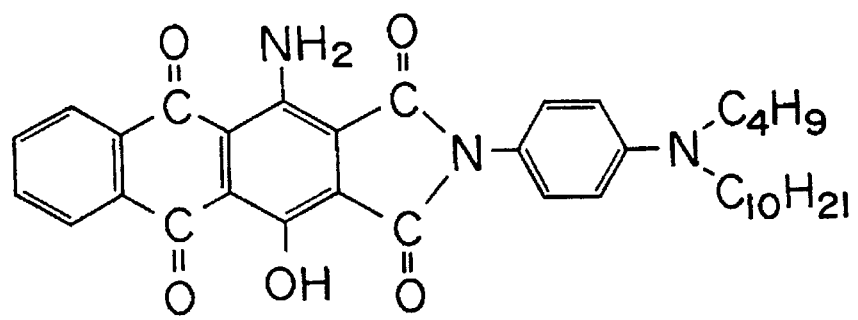
F I G. 93
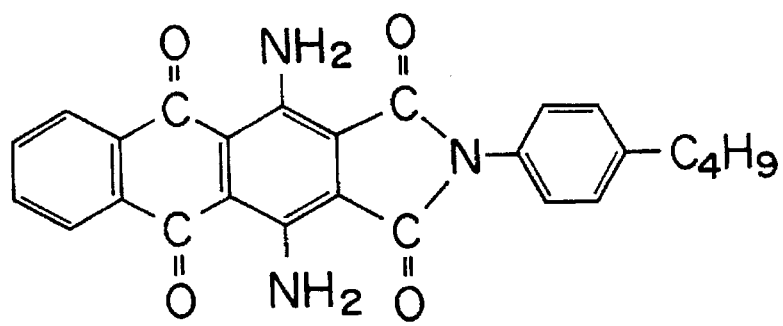

LIQUID CRYSTAL COMPOSITION, LIQUID CRYSTAL DEVICE USING THE SAME, LIGHT CONTROLLING ELEMENT, RECORDING MEDIUM, AND LIGHT SHUTTER

BACKGROUND OF THE INVENTION

1. Field of the Invention

The present invention relates to a liquid crystal composition having a property which can be changed by controlling an applied external field such as an electric field or thermal field in a manner that is suitable for use in various types of devices. The liquid crystal composition of the present invention is useful, e.g., as a light-scattering-type light-controlling material for use in, for example, a light valve, a light-controlling glass, a recording medium, a light shutter, etc., and in devices using the same. Furthermore, the liquid crystal composition of the present invention can be used in other various applications which take advantage of the change in property.

The present invention also relates to a liquid crystal device using a liquid crystal composition.

The present invention furthermore relates to a light-scattering-type light-controlling material using a liquid crystal composition.

The present invention furthermore relates to a recording medium and a recording element using a liquid crystal composition. The recording element can be used as, for instance, a tag or a card in which information is written in the form of characters and the like, a labeling card carrying information such as bar codes, or certain types of displays.

The present invention also relates to a temperature-sensitive light shutter using a liquid crystal composition, which autonomously controls light transmittance in correspondence with the ambient temperature. The light shutter can be applied to, for instance, the sunroofs of automobiles, general use windows of houses, windows for sun-rooms and green houses, etc., to control the quantity of incident sun light so as to correspond to the temperature inside the room. The present invention is not only applicable to those described above, but is also useful in a variety of fields.

2. Description of the Related Art

So-called twisted nematic liquid crystal elements (in the liquid crystal elements of this type, the liquid crystal molecules inside the cell are twisted in the alignment direction by applying an alignment treatment to wall portions of the cell disposed opposed to each other) and ferroelectric liquid crystal elements have been heretofore developed as light-controlling elements using liquid crystal compositions. The use of polarizer sheets is essential in these elements. Disadvantages, such as their inability of provide a bright display or their narrow viewing angle, have been pointed out.

To overcome these problems, attempts have been made to develop a field-effect light-scattering light-controlling material, and its application for light-controlling or display elements has been studied. A field-effect light-scattering-type light-controlling material generally attempts to provide a light-shielding state by aligning domains of liquid crystal in random directions to realize a light-scattering state, and to provide a transparent state by applying an electric field which aligns the domains in one direction.

A light-scattering-type light-controlling material is disclosed, for example, as a "liquid crystal light modulation material" in International Unexamined Patent Publication No. WO 87/01822, or as a polymer dispersion-type liquid crystal in "liquid crystal structure and liquid crystal optical device", Japanese Patent Publication No. 52843/1991 both references incorporated herein by reference. In the polymer-dispersion-type liquid crystal, domains are formed in a transparent polymer matrix by providing a plurality of small cells in a dispersed state and filling them with low-molecular liquid crystals [the first related art].

However, because the transparent state of low-molecular liquid crystal is maintained by applying an electric field to a polymer-dispersion-type liquid crystal of the first related art above, continuous application of an electric field is necessary to keep the liquid crystal transparent. In short, the liquid crystal of the first related art has no memory function. Concerning the durability of the liquid crystal and power consumption, accordingly, a light-scattering-type light-controlling material of the type mentioned above is not advantageous.

A low-molecular liquid crystal/high-molecular liquid crystal composite is proposed as another type of light-scattering material having a memory function. Examples of this type of light-scattering material include such disclosed in T. Kajiyama et al., *Chemistry Letters*, (1989) pp. 817–820 incorporated herein by reference. The composite becomes transparent on turning ON a high frequency alternating current (AC) electric field, but it becomes opaque by turning ON a low frequency AC electric field. The composite exhibits a memory function, because each of the states are stably maintained even after the electric field is removed [a second related art].

However, the composite of the second related art employs a high-molecular liquid crystal which increases the viscosity of the system. Because of the high viscosity, the composite suffers from a much longer response time as compared to that of an ordinary liquid crystal system. This is the disadvantage of the composite according to the second related art.

Conclusively, by taking the first and the second related art above into consideration, no liquid crystal composition satisfying the conflicting requirements on memory function and rapid response suitable for a light-scattering-type light-controlling material has yet been made available.

Concerning a recording medium and a recording element using a liquid crystal composition, proposed are those in which information is recorded by using a laser beam or by heating. Useful rewritable recording media include those utilizing a liquid crystal. Specifically mentioned as recording media using a liquid crystal are those using a smectic liquid crystal (i.e., a group of liquid crystals having not only an ordered alignment but also a layered structure, and having a relatively inferior electric field response), a low-molecular liquid crystal such as a mixture of nematic and cholesteric liquid crystals (i.e., nematic liquid crystal is a group of liquid crystals having an ordered alignment only and a relatively favorable electric field response; cholesteric liquid crystal is a group of liquid crystals having a screw structure in an ordered alignment and an ordinary electric field response), a side-chain-type polymer, or a composite of high-molecular weight liquid crystal/low-molecular weight liquid crystal (sometimes referred to hereinafter simply as a "high-molecular liquid crystal/low-molecular liquid crystal").

In general, however, recording media using low-molecular liquid crystals are disadvantageous in terms of recording stability, and those using high-molecular liquid crystal require that a high temperature be applied to erase the information.

In the field of light shutters using a liquid crystal composition, extensive studies have been conducted, and reports have been made on various types of liquid crystal material which controls light according to changes in the temperature. For example, the study described in A. Sasaki et al., *J. Appl. Phys.* vol.45 (1974) p.4356 incorporated herein by reference relates to a change in light transmittance along with temperature change of a nematic liquid crystal. In A. Sasaki et al., *IEEE Trans. Electron Devices*, vol.ED-22 (1975) p.805 incorporated herein by reference, disclosed is a thermo-optic effect of a mixed nematic-cholesteric liquid crystal [the third related art].

In the third related art above, no material capable of becoming transparent at lower temperatures and opaque at higher temperatures has been reported up to the present time. Considering a common case of controlling temperature, if there should be a liquid crystal material capable of turning transparent at a characteristic temperature or lower to increase the amount of transmitted light and turning opaque at a temperature higher than the characteristic temperature to decrease the amount of transmitted light, the liquid crystal material can be used as a novel light shutter for controlling temperature.

Conventionally, incident sun light has been controlled by a means varying from simple ones comprising the use of, for example, a curtain, a blind, a sun shade, etc., to other types of materials taking advantage of an electro-optic effect, such as a polymer-dispersed liquid crystal, an electrochromic material, or a grain-dispersed light-controlling material, as well as a photochromic material and the like utilizing photochemical reactions.

However, except for the photochromic materials, the aforementioned related art technologies are not capable of autonomously controlling the quantity of incident light. More specifically, the quantity of incident light must be controlled by manually applying a predetermined operation, or by turning on a means for controlling the incident light according to a signal sent from a temperature sensor or the like. It can be seen therefrom that such technology not only is laborious, but also expensive, due to the cost necessary for providing a complicated constitution such as a sensor or a control means.

A photochromic material as referred to above is capable of autonomously controlling incident light. However, it is light-sensitive and not temperature-sensitive. In general, depending on the ambient temperature, people sometimes feel that intense sun light is favorable while sometimes they prefer weak sun light. Thus, a light shutter of a temperature-sensitive type is more desirable for practical applications.

SUMMARY OF THE INVENTION

In light of the aforementioned circumstances, a first object of the present invention is to provide a liquid crystal composition having a property that, or is capable of functioning to, control light transmittance.

To accomplish the first object of above, the present inventors discovered that a liquid crystal composition comprising a liquid crystal and a second substance dispersed therein exhibit a unique property as a result of the mutual reaction between the second substance and the liquid crystal molecules.

A second object of the present invention is to provide a liquid crystal device suitable for controlling light transmittance, by taking advantage of the characteristics of the liquid crystal composition described above.

As a result of the studies conducted by the present inventors to achieve the aforementioned second object, it has been discovered that a plurality of liquid crystal domains are formed in the liquid crystal composition described above by the flat plate-shaped particles as the second substance, and that these plurality of domains are controllable to realize a so-called multi-domain structure. The term "liquid crystal domain" as referred herein is an aggregate of neighboring liquid crystal molecules, the aggregate having an alighnment director formed by the molecules and being distinguished from the surrounding liquid crystal material, and "multi-domain structure" is a state realized by the formation of aggregates of liquid crystal domains inside the liquid crystal matrix, in which the alignment directors of the liquid crystal domains are random.

A third object of the present invention is to provide a field effect light-scattering light-controlling material having a memory function and rapid response.

The present inventors conducted studies to accomplish the third object. As a result, it has been discovered that this object is achieved by preparing a composition based on an electric-field sensitive liquid crystal having a positive dielectric anisotropy, with flat plate-shaped particles having affinity for the liquid crystal being added and dispersed therein. Thus, by using the resulting composition and applying thereto, for instance, an electric field to control the alignment of the liquid crystal composition molecules (or both the liquid crystal composition molecules and flat particles) or a thermal field to control the phase change of liquid crystal, various types of functions suitable for use in a variety of devices can be made available.

A fourth object of the present invention is to provide a light-scattering light-controlling material in which the difference between its light-transmitting state and light-scattering state in terms of transmitted light is further increased; i.e., the light-controlling contrast of the light-controlling material is increased.

It has been discoverd that the fourth object of the present invention above is accomplished by designing a light-scattering light-controlling material of a light-scattering-type in such a manner that it can exhibit a light-absorbing effect at the same time. The light-controlling contrast can be further increased by taking advantage of both the light-scattering effect and the light-absorbing effect in this manner.

A fifth object of the present invention is to provide a recording medium and a recording element using a liquid crystal composition, which is capable of not only easily recording information, but also stably storing the recorded information for long periods of time, and, which also enables the recording of information and erasing of the recorded information simply.

It has been discovered that the fifth object of the present invention can be accomplished by preparing a composition based on an electric-field sensitive liquid crystal having a positive dielectric anisotropy, with flat plate-shaped particles having affinity for the liquid crystal being added and dispersed therein. The term "dielectric anisotropy" is a value corresponding to the difference in dielectric constant obtained by subtracting the dielectric constant in the minor axis direction from that in the major axis direction. Liquid crystal molecules having a positive dielectric anisotropy align in a direction in parallel with the applied electric field, and those having a negative dielectric anisotropy align in a direction perpendicular to that of the applied electric field. Thus, by using the resulting composition and applying thereto, for instance, an electric field to control the alignment of the liquid crystal composition molecules (or both the liquid crystal composition molecules and flat particles)

or a thermal field to control the phase change of liquid crystal, various types of functions suitable for use in a recording medium or a recording element can be made available.

A sixth object of the present invention is to provide a liquid crystal material which exhibits a novel type of thermo-optic effect; it turns transparent at a temperature lower than a desired characteristic temperature, but becomes opaque at a temperature higher than the characteristic temperature. It is also an object of the present invention to provide a temperature-sensitive light shutter which autonomously controls the light transmittance using the liquid crystal material.

The sixth object of the present invention is accomplished by preparing a composition based on a liquid crystal with flat plate-shaped particles having affinity for the liquid crystal being added and dispersed therein. Thus, by applying a thermal field to the composition in order to control the phase change of liquid crystal, various types of functions suitable for use as a temperature-sensitive light shutter can be obtained according to the formation and the disintegration of domains depending on the behavior of the flat plate-shaped particles.

First Aspect of the Present Invention

According to a first aspect of the present invention and with am aim towards accomplishing the first object above, there is provided a liquid crystal composition comprising a liquid crystal and a second substance dispersed therein, the second substance having affinity for the liquid crystal and a particle size and an aspect ratio of at least a predetermined value, the second substance being capable of providing plural domains in the liquid crystal.

Although there is no particular restriction concerning the type, the shape, and the constituent materials of the second substance, representative are flat plate-shaped particles. The liquid crystal composition of the first aspect may additionally contain a dichromatic dye. The aspect ratio in general is 2 or more, and more preferably, 5 or more. "Affinity" of a particle for a liquid crystal referred to herein is the property that the particle can fall in a more stable state through interfacial interaction between the liquid crystal and the particle. Accordingly, a particle having affinity for a liquid crystal is well dispersed in the liquid crystal. On the contrary, a particle without affinity for a liquid crystal is likely to aggregate each other, because inter-particle interaction is larger than the interaction between the liquid crystal and the particle. Therefore, the particle without affinity for a liquid crystal can not be stably dispersed in the liquid crystal.

Second Aspect of the Present Invention

According to a second aspect of the present invention, there is provided a liquid crystal device comprising a liquid crystal, a means for forming multi-domains, and a means for dissolving the multi-domains.

Various types of means can be used for forming multi-domains, however, a representative one is the use of flat plate-shaped particles dispersed in the liquid crystal. Flat plate-shaped particles of any type and of any material can be used.

A variety of means can be used for dissolving multi-domains, however, included in the representative ones are a device for applying an electric field to the multi-domains and a temperature control device. The liquid crystal for use in the second aspect may additionally contain a dichromatic dye.

Third Aspect of the Present Invention

A third aspect of the present invention with an aim to accomplish the aforementioned third object, there is provided a liquid crystal composition comprising an electric field sensitive liquid crystal having a positive dielectric anisotropy and flat plate-shaped particles having affinity for the liquid crystal, the particles being dispersed in the liquid crystal at such a density to effectively form plural domains within the liquid crystal.

Fourth Aspect of the Present Invention

In accordance with a fourth aspect of the present invention with an aim to accomplish the aforementioned third object, there is provided a light-scattering-type light-controlling element comprising:

a hollow cell having a light-transmitting portion thereof made of a transparent material;

a liquid crystal composition comprising an electric field sensitive liquid crystal having a positive dielectric anisotropy and flat plate-shaped particles having affinity for the liquid crystal, the particles being dispersed in the liquid crystal at such a density to effectively form plural domains inside the liquid crystal;

an electric-field applying means capable of applying an electric field to the liquid crystal composition and forming a memory state, the means being provided on or separate from the cell; and means for releasing the liquid crystal composition from its memory state, the means being separately provided or being attached to the cell.

Fifth Aspect of the Present Invention

According to a fifth aspect of the present invention aimed to accomplish the aforementioned fourth object, there is provided a liquid crystal composition comprising an electric field sensitive liquid crystal having a positive dielectric anisotropy, a dichromatic dye incorporated into the liquid crystal, and flat plate-shaped particles having affinity for the liquid crystal, the particles being dispersed in the liquid crystal at such a density to effectively form plural domains inside the liquid crystal.

The dichromatic dye above is a dye comprising rod-like molecules, and on dissolving the dye molecules in the liquid crystal, the dye molecules align themselves in accordance with the alignment of the liquid crystal molecules as to realize a colored or a discolored state.

Sixth Aspect of the Present Invention

According to a sixth aspect of the present invention aimed to accomplish the aforementioned fifth object, there is provided a recording medium comprising:

a hollow cell having a light-transmitting portion made of a transparent material; and a liquid crystal composition comprising an electric field sensitive liquid crystal having a positive dielectric anisotropy and flat plate-shaped particles having affinity for the liquid crystal, the particles being dispersed in the liquid crystal at such a density to effectively form plural domains inside the liquid crystal.

Seventh Aspect of the Present Invention

In accordance with a seventh aspect of the present invention aimed to accomplish the aforementioned fifth object, there is provided a recording element comprising:

a recording medium of the sixth aspect of the present invention above;

an information recording means which is capable of realizing a particular light transmitting state in specified portions in a well distinguished manner from other portions of the recording medium; and a record erasing means which is capable of releasing the specified portions above from the particular light transmitting state.

Eighth Aspect of the Present Invention

According to a eighth aspect of the present invention aimed to accomplish the aforementioned sixth object, there is provided a liquid crystal composition comprising a liquid crystal and flat plate-shaped particles having affinity for the liquid crystal, the particles being dispersed in the liquid crystal at a density as such that plural domains in liquid crystalline state are formed effectively and that light scattering ascribed thereto does not substantially influence the light transmittance of the liquid crystal composition.

Ninth Aspect of the Present Invention

In accordance with a ninth aspect of the present invention aimed to accomplish the aforementioned sixth object, there is provided a temperature-sensitive light shutter comprising:

a hollow cell made of a transparent material; and a liquid crystal composition comprising a liquid crystal and flat plate-shaped particles having affinity for the liquid crystal, the particles being dispersed in the liquid crystal at a density as such that plural domains are formed effectively in the liquid crystalline state.

The above and other objects, features, and advantages of the present invention will become more apparent from the following description when taken in conjunction with the accompanying drawings in which a preferred embodiment of the invention is shown by way illustrative examples.

BRIEF DESCRIPTION OF THE DRAWINGS

FIG. 1 is a diagram showing the function of a third aspect of the present invention;

FIG. 3 is a diagram showing the function of a sixth and a seventh aspect of the present invention;

FIG. 6 is a diagram showing the function of a eighth and a ninth aspect of the present invention;

FIGS. 8 to 64 are chemical structural formulae of liquid crystal molecules;

FIGS. 65 to 95 are chemical structural formulae of dichromatic dyes;

DETAILED DESCRIPTION OF THE INVENTION

Figure 2A:
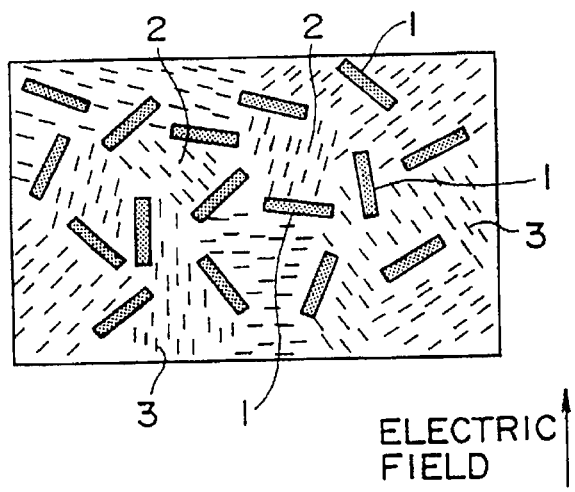
FIGS. 2A to 2E are each a diagram showing an alignment state of liquid crystal molecules and flat, plate-shaped particles according to the change in light transmittance shown in FIG. 1.

In the first aspect of the present invention, the particles of a second substance having affinity for the liquid crystal are dispersed favorably in the liquid crystal in a random alignment. As a result, a plurality of liquid crystal domains is created, the periphery thereof loosely partitioned by the particles of the second substance. See, for example, FIG. 2A where element 1 is representative of the second substance and the two elemetns 2 represent different liquid crystal domains.

Thus, the liquid crystal composition according to a first aspect of the present invention can be used in various existing and novel types of applications utilizing the functions, inclusive of those yet to be realized, attributed to the liquid crystal domains.

A representative example of the applications described above is a liquid crystal device according to the second aspect of the invention. In the liquid crystal composition of the first aspect, the liquid crystal domains may or may not take a multi-domain state. See, for example, FIG. 2B where the average directors of the domains are all substantially identical. Various types of transmitting rays, for instance, a transmitting light, can be scattered by the liquid crystal composition in a multi-domain state. However, when the liquid crystal composition is not in the multi-domain state, this function is not exerted to a transmitting ray.

Thus, by controlling the forming of multi-domains and the dissolving of multi-domains a liquid crystal device of the second aspect can be utilized for controlling the transmittance of a transmitting ray. More specifically, when the transmitting ray is accompanied by heat such as sunlight, the heat flow can be controlled.

A third and a fourth aspect of the present invention are described below referring to FIG. 1 and FIGS. 2A to 2E. FIG. 1 shows the change in light transmittance of a liquid crystal composition of the third aspect of the present invention, obtained by sealing the composition between cell plates (not shown in the figure) made of a transparent material and equipped with a transparent electrode and a means for controlling temperature, and placing the composition into an electric field and a thermal field controlled according to a predetermined program. A cell with one transparent side and one reflecting side may also be used throughout the invention. FIGS. 2A to 2E each show an assumed state of the liquid crystal composition corresponding to the change in light transmittance shown in FIG. 1, FIGS. 2A (2E), 2B, 2C, 2D corresponding to (1), (2), (3), and (4) in FIG. 1, respectively- Because flat plate-shaped particles have high affinity for the liquid crystal, the particles are favorably dispersed in the liquid crystal composition. The following explanation of the function of the present aspect may be based on the fact that the flat, plate-shaped particles are preferably present in the liquid crystal at a density such that the light transmittance of the liquid crystal composition is not substantially influenced by the light scattering effect exerted by the flat, plate-shaped particles.

Figure 2B:
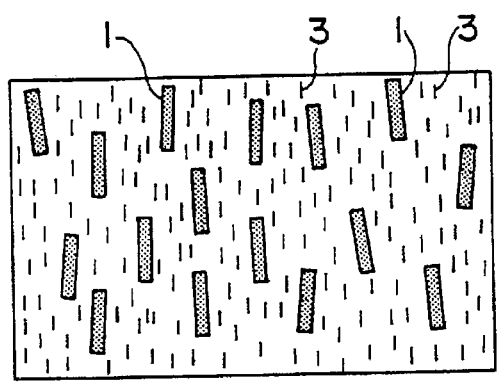

When the liquid crystal composition is placed in a state in which no voltage is applied thereto and at a liquid crystalline temperature (i.e., a temperature at which a liquid crystalline state is maintained), the flat, plate-shaped particles 1 are found to be dispersed in a random alignment as shown in FIG. 2A. As a result, a plurality of loose cell structures (domains) 2 are formed in such a manner that each may be surrounded by flat, plate-shaped particles 1 which function as partitions. The alignment of the liquid crystal molecules 3 which constitute the domains 2 depends on the alignment of the flat, plate-shaped particles 1 which partition the cell structures 2. Accordingly, the liquid crystal molecules 3 arrange themselves inside the individual domain resulting in a random alignment. Thus, the liquid crystal composition as a whole exhibits a state of low light transmittance (light-scattering state) as indicated by numeral (1) in FIG. 1.

On applying a voltage to the cell plates made of a transparent material and equipped with a transparent electrode, the electric-field-sensitive liquid crystal molecules 3, which have positive dielectric anisotropy, align themselves in the direction of the applied voltage. It is believed that the flat, plate-shaped particles 1, although they are not electric-field-sensitive, are driven by the force exerted by the aligning liquid crystal molecules 3 to align themselves in the same direction as that of the liquid crystal molecules 3. As a result, the previous cell structure 2 is found to be destroyed, and a highly light-transmitting state (transparent state) is found to be newly developed in the liquid crystal composition as shown in FIG. 1 with numeral (2). The change from state (1) to state (2) according to FIG. 1 occurs extremely swiftly, generally within about 10 to 20 msec. Accordingly, the liquid crystal composition can safely be said to have a quick response.

When the applied voltage is turned off, although with a slight decrease, the light transmittance is found to be almost maintained at the level achieved by applying a voltage. The transparent state is retained for as long as no external interference is applied to the composition. Conclusively, the liquid crystal composition has a memory function. The memory function is believed to be based on a mechanism described below.

Figure 2C:
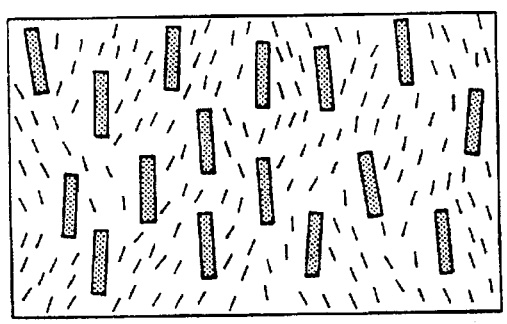

When the applied voltage is turned off, the alignment of the flat, plate-shaped particles 1 is preserved while all of the liquid crystal molecules 3 in the liquid crystal composition arrange themselves to acquire the same alignment as that of the flat, plate-shaped particles 1. It can be seen therefrom that the light-scattering state as illustrated in FIG. 2A would not be recovered. The slight drop in light transmittance occurring during this memory state is assumably due to the slight fluctuation in the alignment of the flat, plate-shaped particles 1 in the state of an applied voltage. More specifically, because flat, plate-shaped particles 1 do not align autonomously, the alignment thereof is not always completely uniform. Thus, it is assumed that upon releasing the flat, plate-shaped particles 1 from the applied voltage, extremely incomplete domains showing fluctuation in the alignment of liquid crystal molecules as shown in FIG. 2C to develop.

Up to the present, the following two are known as practical and effective means for releasing the liquid crystal composition from its memory state.

One method for releasing the liquid crystal composition from its memory state is to elevate the temperature thereof to an isotropic temperature (i.e., a temperature at which the liquid crystal acquires an isotropic state). More specifically, a liquid crystal composition in its memory state is heated to an isotropic temperature using a temperature-controlling means, and is cooled thereafter to the liquid crystalline temperature. The light transmittance slightly increases as indicated with the numeral (4) in FIG. 1, and then greatly decreases to a value indicated with the numeral (5) in FIG. 1 to recover the light scattering state. Conclusively, a liquid crystal composition of the third aspect of the present invention has a memory function and quick response, and yet, changes from a transparent state to a light-scattering state depending on the thermal field applied thereto.

Figure 2D:
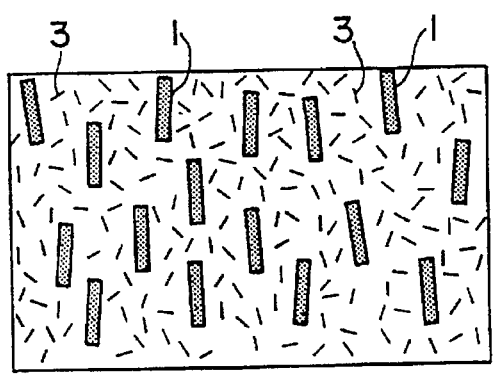

Assumably, the liquid crystal composition is released from its memory state by means of the following mechanism. With the temperature increased to isotropic temperature, the liquid crystal molecules 3 are found to be dispersed in a random alignment as shown in FIG. 2D. As a result, light transmittance once increases to a slightly higher value, and the fluctuation in the alignment of flat, plate-shaped particles 1 also increases as influenced by the alignment of the liquid crystal molecules 3 in the isotropic state. By lowering the temperature to a liquid crystalline temperature, a plurality of loose cell structures (domains) 2 are formed in such a manner that each may be surrounded by flat, plate-shaped particles 1 that are aligned with some fluctuation. See FIG. 2E. Thus, the liquid crystal molecules 3 inside the cell structures 2 arrange themselves according to each domain to result in a random alignment. Thus, the liquid crystal composition as a whole recovers the light-scattering state.

Figure 2E:
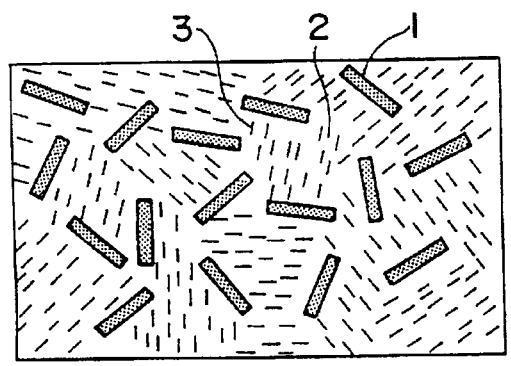

In some cases, the light transmittance for a light-scattering state indicated by (5) in FIG. 1 is higher than that for a state indicated by (1) in FIG. 1. Such a state can be dissolved and a light scattering state as illustrated in FIG. 2E (equivalent to a state illustrated in FIG. 2A) can be recovered by applying a second means which, as described below, is a shearing force, to the liquid crystal composition. Light transmittance of a level indicated by (1) in FIG. 1 can be recovered. The liquid crystal composition can acquire the transparent state as shown in FIG. 2B again by either applying voltage after the liquid crystal composition is released from the memory state, or the applied voltage after the shearing force has been applied.

A second means for recovering the liquid crystal composition from its memory state is to externally apply a shearing force such as vibration or impact to the liquid crystal composition which is in its memory state. When a shearing force is applied to the liquid crystal composition, all of the flat, plate-shaped particles 1 instantaneously undergo a change in state to acquire a random alignment state. Upon attaining the light scattering state as illustrated in FIG. 2E, the light transmittance of the liquid crystal composition also returns to a level indicated by (1) in FIG. 1. Thus, in this case, light transmittance decreases from a level indicated by (3) to the initial level (1) shown in FIG. 1.

The description of the third and fourth aspects of the present invention is based on an amount of flat, plate-shaped particles present in the liquid crystal composition such that the light transmittance of the liquid crystal composition is not substantially influenced by the light scattering effect exerted by the flat, plate-shaped particles. However, if the flat, plate-shaped particles 1 are present at such a density as to substantially influence the light transmittance of the liquid crystal composition, the light transmittance in the light-scattering states corresponding to those illustrated in FIGS. 2A and 2E would be further lowered because of the light-scattering effect exerted by the randomly aligned flat, plate-shaped particles 1. This signifies that the light-controlling contrast is further increased. The other points are basically the same as those described in the foregoing.

Conclusively, a liquid crystal composition of a third aspect of the present invention provides a field effect light-scattering light-controlling material having a memory function and quick response.

A light-scattering-type light-controlling element of a fourth aspect of the present invention exhibits a memory function and quick response.

According to the constitution of a fifth aspect of the present invention, a dichromatic dye is added into a liquid crystal composition according to the third aspect of the present invention. By selectively using various types of dyes differing in absorption spectra, a desired color can be imparted to the light transmitted by the liquid crystal composition.

Referring to FIG. 2A, the liquid crystal composition in a light-scattering state comprises randomly aligned dichromatic dye molecules to absorb light. In the transparent state or the memory state corresponding to FIG. 2B or FIG. 2C, respectively, the dichromatic dye molecules are driven by the alignment movement of the liquid crystal molecules to align themselves accordingly. Thus, a light-absorbing effect is no longer observed. Upon applying a shearing force to the liquid crystal composition, or by heating and cooling it to isotropic, the dichromatic dye molecules recover their random orientation to exhibit again the light absorbing effect. Thus, because the dichromatic dye molecules exhibit or lose a light-absorbing effect synchronously with the light scattering state and the transparent state of the liquid crystal composition, a higher light-controlling contrast can be obtained as a result. The other points are basically the same as those described in the function of the third aspect of the present invention.

Conclusively, the liquid crystal composition according to a fifth aspect of the present invention provides, in addition to the same effects as those of a liquid crystal composition of a third aspect of the invention, a colored liquid crystal composition with a further increased light-controlling contrast.

Referring to FIG. 3, FIGS. 4A to 4D, and FIG. 5, the function and the effects of a sixth and a seventh aspect of the present invention are described below.

Figure 5:
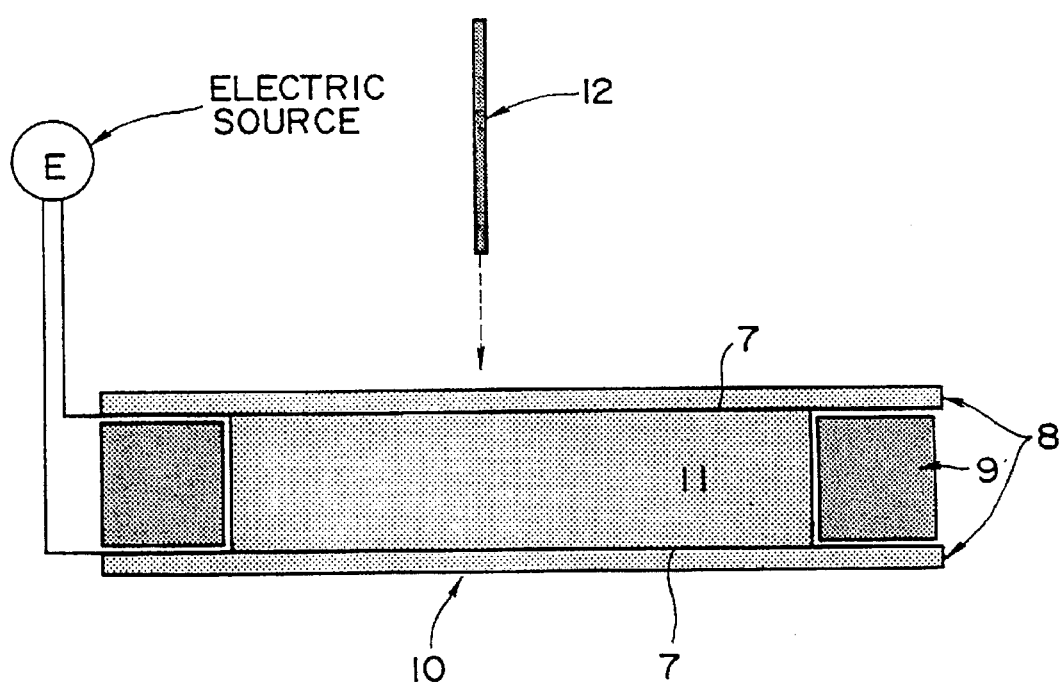
FIG. 5 is a scheme of the constitution of a recording medium and recording element.

FIG. 5 shows a recording element fabricated according to a seventh aspect of the present invention. According to the seventh aspect, a pair of spacers 9 and a means for erasing recorded information comprising a pair of cell plates 8 made of a transparent material and having transparent electrodes 7 attached thereto constitute a flat and transparent recording medium cell 10, and a liquid crystal composition 11 defined in the third aspect of the present invention is sealed inside the cell 10. Furthermore, as a means for recording information as defined in the seventh aspect, a thermal head 12 for elevating the temperature of the selected portions of the liquid crystal composition 11 is placed in the vicinity of the cell 10.

The recording element above was controlled in a programmed electric field and a programmed operation of a thermal head to observe the change in transmittance. The results are shown in FIG. 3.

FIGS. 4A to 4D show each an assumed state of the liquid crystal composition 11 corresponding to the change in light transmittance given in FIG. 3, FIGS. 4A, 4B, 4C and 4D corresponding to A,B,C, and D in FIG. 3, respectively. Because flat, plate-shaped particles 4 have a high affinity for the liquid crystal, the particles 4 are favorably dispersed in the liquid crystal composition 11. One possible explanation of the function of the present aspect is made on the basis that preferably the flat, plate-shaped particles 4 are present in the liquid crystal composition at a density such that the light transmittance of the liquid crystal composition 11 is not substantially influenced by the light-scattering effect exerted by the flat, plate-shaped particles.

Figure 4A:
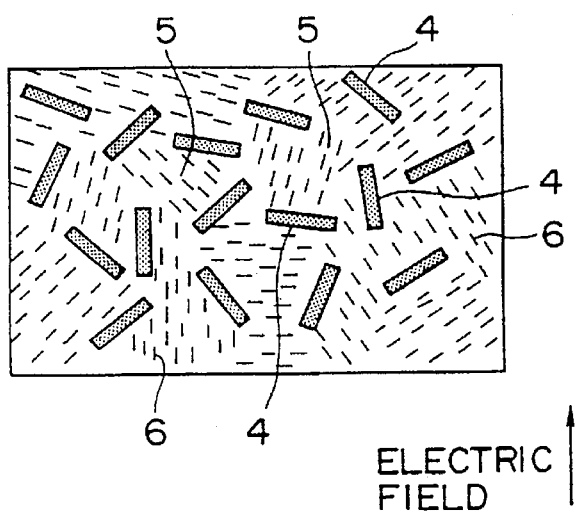
FIGS. 4A to 4D are each a diagram showing an alignment state of liquid crystal molecules and flat, plate-shaped particles according to the change in light transmittance shown in FIG. 3.
Figure 4B:
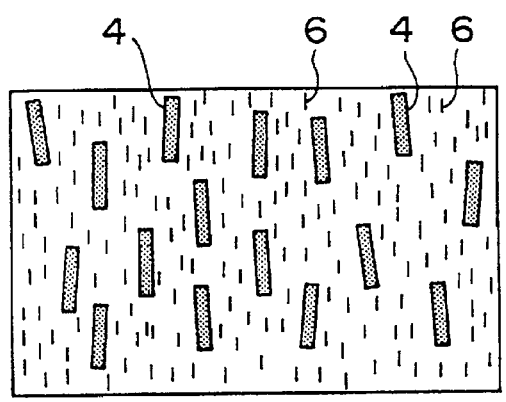

Initially, when the liquid crystal composition 11 of the recording medium cell 10 is placed in a state in which no voltage is applied thereto and at a liquid crystalline temperature, the flat, plate-shaped particles 4 are found to be dispersed in a random alignment as shown in FIG. 4A. Thus, a plurality of loose cell structures (domains) 5 are formed in such a manner that each may be surrounded by flat, plate-shaped particles 4 which function as partitions. The alignment of the liquid crystal molecules 6 which constitute the domains depends on the alignment of the flat plate-shaped particles 4 which partition the domains 5. Accordingly, the liquid crystal molecules 6 arrange themselves according to the individual domain to result in a random alignment. Thus, the liquid crystal composition 11 as a whole exhibits a state of low light transmittance (light scattering state). This state is referred to hereinafter as "initial state" During the initial state, the light transmittance obtained on the cell 10 is also low as shown in FIG. 3 with A.

On applying a voltage to the cell 10 through the transparent electrodes 7, the electric-field sensitive liquid crystal molecules 6, which have positive dielectric anisotropy, align themselves in the direction of applied voltage. It is believed that the flat, plate-shaped particles 4, although they are not electric-field-sensitive, are driven by the alignment force exerted by the liquid crystal molecules 6 to align themselves in the same direction as that of the liquid crystal molecules 6. As a result, the previous cell structures (domains) 5 are found to be destroyed, and a state of yielding high light transmittance (transparent state) is found to be newly developed in the liquid crystal composition 11. The light transmittance of the cell 7 increases accordingly as shown with B in FIG. 3.

When the applied voltage is turned off, although with a slight decrease, the light transmittance of the liquid crystal composition 11 is found to be almost completely maintained at level C indicated in FIG. 3 unless a particular interference is applied externally. This state is referred to hereinafter as a "recordable state". It can be seen from the foregoing that the recording medium and the recording element of the present invention exhibits a preservable "recordable state". The preservability of the recordable state is assumed to be exhibited according to the following mechanism.

Figure 4C:
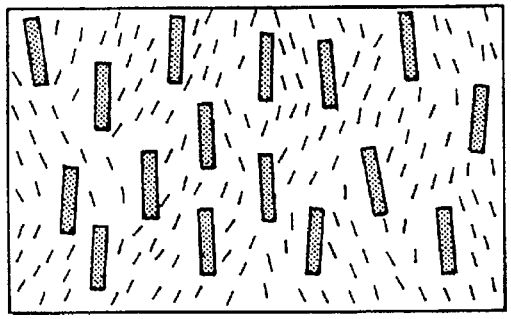

When the applied voltage is turned off, the alignment of the flat, plate-shaped particles 4 is preserved while all of the liquid crystal molecules 6, which are under a liquid crystalline temperature, arrange themselves to acquire the same alignment as that of the flat, plate-shaped particles 4. It can be seen therefrom that the light-scattering state as illustrated in FIG. 4A is not recovered. The slight drop in light transmittance for this recordable state as compared with that in a state in which voltage is applied (indicated with B in FIG. 1) is assumably due to the slight fluctuation remaining in the alignment of the particles 4 in the state in which a voltage is applied. More specifically, because flat, plate-shaped particles 4 do not align autonomously, the alignment thereof is not always completely uniform. Thus, it is assumed that upon releasing flat, plate-shaped particles 4 from applied voltage, extremely incomplete domains showing a fluctuation in the alignment of liquid crystal molecules as shown in FIG. 4C develop.

A thermal head 12 is applied thereafter to a specified portion of a cell 10 in a recordable state to record the desired information. That is, the thermal head 12 is applied to the cell according to a predetermined operational procedure corresponding to the information to be recorded, and the temperature of the particular portion in the liquid crystal composition 11 to which the thermal head 12 is operated is elevated to the isothermal temperature of the liquid crystal composition 11. The light transmittance of the particular portion in the liquid crystal composition 11 increases slightly as indicated by D in FIG. 3, and decreases abruptly to a level shown by E in FIG. 3 on naturally cooling down the portion to the liquid crystalline temperature to recover the light scattering state. This state is referred to hereinafter as a "recording state". The recording state can be maintained so long as no particular interference is applied externally to the liquid crystal composition, and is therefore preservative. FIG. 3 reads that the light transmittance in the recording state is slightly higher than that in the initial state, but that the light-scattering state is approximately the same for both states.

The other portions of the liquid crystal composition 11 to which thermal head 12 is not applied remain in the recordable state because they are not heated to the isotropic temperature. Thus, the portion of the liquid crystal composition 11 which was converted into a recording state exhibits a particular transparent state differing from that of the surrounding portions which maintain the recordable state. Because the light transmittance of the portions in the recordable state and that of the portion in the recording state differs to give contrast, a significant pattern corresponding to the movement of the thermal head 12 can be formed on the liquid crystal composition 11.

The preservability of the recording state and the recordable state above is very stable unless a shearing force or heat followed by cooling is applied to the liquid crystal composition. For example, vibration or an impact of an ordinary level may be applied without any problem. Thus, except for the case in which a shearing force is intentionally applied to the recording medium or element, or the liquid crystal is heated to isotropic, a cell with a proper stiffness is preferred for use in the recording medium or recording element of the present invention to prevent an external shearing stress from being exerted to the liquid crystal composition.

Figure 4D:
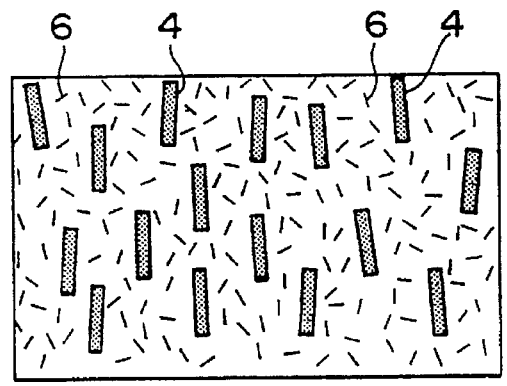

The portion to which a thermal head 12 is applied undergoes change in state from a recordable state to a recording state. The mechanism of this change is assumed to be as follows. When the temperature of the liquid crystal composition 11 is elevated to an isotropic temperature, an isotropic state in which the liquid crystal molecules 6 align randomly as shown in FIG. 4D is realized. As a result, light transmittance once increases to a slightly higher value, and the fluctuation in the alignment of flat, plate-shaped particles 4 occurs by being influenced by the alignment of the liquid crystal molecules 6 in the isotropic state. The distortion of the particle orientation is, however, not so much as that shown in FIG. 4A. By lowering the temperature again to a liquid crystalline temperature, a plurality of loose cell structures (domains) 5 are formed in such a manner that each may be surrounded by flat, plate-shaped particles 4 which are aligned with some fluctuation. Thus, the liquid crystal molecules 6 inside the cell structures 5 arrange themselves according to each domain to result in a random alignment. Thus, the liquid crystal composition 11 as a whole recovers the light scattering state.

In this manner, a desired piece of information is recorded as the pattern of a combination of recordable portions and recording portions in correspondence with the information. The pattern may directly constitute a particular meaningful character, diagram, symbol, etc., or may be a enciphered, cryptographed, symbolized, or graphic pattern which is read using a proper readout. The recorded information can be read by the user either visually by the naked eye or by using a proper readout.

In reading the recorded information, light is necessary to clearly distinguish the light transmittance of the recordable portions from that of the recording portions. However, in some cases, sun light, indoor illumination or the like function as incident light to the cell 10 to make the information readable. Thus, a light source is not always indispensable for the recording element. In case a light source is provided to the recording element, the light source may be of any radiation wavelength from the region of visible, infrared, to ultraviolet. Otherwise, laser radiation of any wavelength can be used. The positional relation between the light source and the readout means for the information differs depending on whether the recording element employs a method of a light-transmitting type or a light-reflecting type for the readout.

The information recorded in the cell 10 can be erased by applying an electric field using an electrode 7 as the erasing means. More specifically, by applying an electric field for a short period of time to a cell 10 having recorded information, the recording portion of the liquid crystal composition 11 undergoes the same change as in the initial state in which a voltage is applied, and recovers the light-transmitting state (i.e., the recordable state indicated by C in FIG. 3) similar to that in the surrounding portions of liquid crystal composition 11. The recorded information can be erased in this manner. The change from one state to the other above as mentioned occurs extremely swiftly, generally in a response time of about 20 msec or less. In case the electric field is applied by using an electrode 7, the means itself can be operated easier, and the method is also less severe as compared with a conventional one operated at higher temperatures.

As described in the foregoing, the recording medium or the recording element of the present invention can repeatedly record a desired piece of information and erase the recorded information by using an information recording means and a record erasing means.

Although it is unnecessary in routine operation, the liquid crystal composition can be returned to its initial state by applying a shearing force irrespective of whether the liquid crystal composition is in a recordable state or in a recording state. By applying a shearing force, the flat, plate-shaped particles 4 become randomly aligned to form a plurality of loose cell structures (domains) 5. Thus, the liquid crystal composition 11 can be returned to its initial state. As a means for applying the shearing force, at least one of the cell plates 8 constituting the cell 10 may be provided slidable within the plane of the cell plate.

The description of the function of the sixth and seventh aspects according to the present invention is based on the fact that the flat, plate-shaped particles 4 are present in the liquid crystal composition 11 at a density such that the light transmittance of the liquid crystal composition 11 is not substantially influenced by the light scattering effect exerted by the flat, plate-shaped particles 4. However, if the flat, plate-shaped particles 4 should be present at a density such that they substantially influence the light transmittance of the liquid crystal composition 11, the light transmittance in the light-scattering states would be further lowered, because of the light-scattering effect exerted by the randomly aligned flat, plate-shaped particles 4. This signifies that the light-controlling contrast is further increased, and no problem is found therein. The other points are basically the same as those described in the foregoing.

Conclusively, the sixth and the seventh aspects of the present invention provide a recording medium and a recording element using a liquid crystal composition, in which pieces of information is easily recordable, the recorded information can be stably preserved for a long duration of time, and the recorded information can be easily erased by a mild means.

Figure 7A:
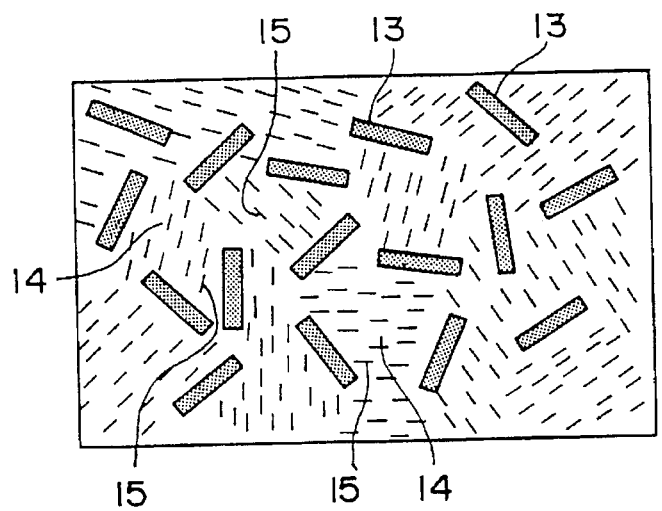
FIGS. 7A to 7C are each a diagram showing an alignment state of liquid crystal molecules and flat, plate-shaped particles according to the change in light transmittance shown in FIG. 6.
Figure 7B:
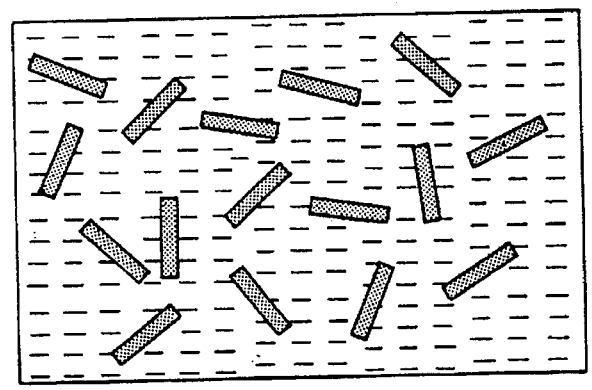
Figure 7C:
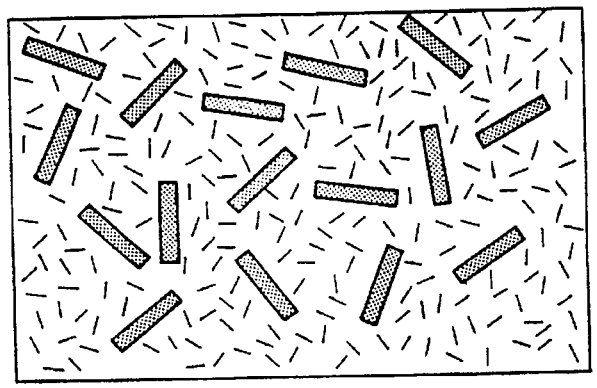

Referring to FIG. 6 and to FIGS. 7A to 7C, the function of the eighth and the ninth aspects of the present invention is described below. The graph in FIG. 6 shows the change in the light transmittance of a light shutter cell fabricated by sealing a liquid crystal composition according to the eighth aspect into a hollow cell (not shown in the figure) made into the shape of a window glass and made from a transparent material. The light shutter cell may be fitted to a window of a room of a house in such a manner that a sunlight may be incident thereto. FIGS. 7A to 7C are each an assumed state for the liquid crystal composition inside the cell. FIG. 7A shows the liquid crystal composition in a liquid crystalline state which exhibits a light transmittance corresponding to a light scattering state A in FIG. 6, FIG. 7B shows the liquid crystal composition in a crystalline state with a light transmittance corresponding to a transparent state B in FIG. 6, and FIG. 7C shows the liquid crystal composition in an isotropic state with a light transmittance corresponding to a transparent state C in FIG. 6.

Because flat, plate-shaped particles 4 have a high affinity for the liquid crystal, the flat, plate-shaped particles are favorably dispersed in the liquid crystal composition. The following possible explanation of the function of the present aspect is based on the presence of the flat, plate-shaped particles in the liquid crystal composition at a density such that the light transmittance of the liquid crystal composition is not substantially influenced by the light-scattering effect exerted by the flat, plate-shaped particles.

Initially, when the liquid crystal composition is placed at an intermediate temperature which lies between the phase transition temperature of crystalline phase-liquid crystalline phase and that of liquid crystalline phase-isotropic phase, the flat, plate-shaped particles 13 are dispersed in a random alignment as shown in FIG. 7A. Thus, a plurality of loose cell structures (domains) 14 are formed in such a manner that each may be surrounded by flat, plate-shaped particles 13 which function as partitions. The alignment of the liquid crystal molecules 15 which constitute the domains 14 depends on the alignment of the flat plate-shaped particles 13 which partition the cell structures 14. Accordingly, the liquid crystal molecules 15 arrange themselves according to the individual domain to result in a random alignment. Thus, the cell as a whole exhibits a state of low light transmittance (light-scattering state) as indicated by A in FIG. 6.

Because the sunlight incident to the room is limited when the cell is in the state mentioned above, the temperature inside the room gradually decreases so as to finally attain the crystalline temperature lower than the crystalline-liquid crystalline-phase transition temperature. On reaching the crystalline temperature, crystallization of the liquid crystal molecules occurs in the liquid crystal composition. As shown in FIG. 7B, the flat, plate-shaped particles 13 are dispersed in a random alignment in a manner similar to that in the liquid crystalline state, however, all of the liquid crystal molecules align themselves in one direction so as to dissolve the domains which had previously developed in the liquid crystalline state.

Thus, the cell exhibits a state of high light transmittance (a transparent state) as indicated by B in FIG. 6, thereby increasing the sunlight incident to the room. As a result, the temperature of the room gradually increases from a level lower than the crystalline-liquid crystalline phase transition temperature to finally exceed the crystalline-liquid crystalline phase-transition temperature. Accordingly, the liquid crystal composition recovers the state shown in FIG. 7A, and the cell returns to the light-scattering state as indicated by A in FIG. 1.

As described in the foregoing, a light shutter cell of the present invention autonomously controls the transmitted light in accordance with the change in temperature inside the room to maintain the temperature inside the room within a constant range.

The description of the function above is based on the idea that the flat, plate-shaped particles are present in the liquid crystal composition at a density such that the light transmittance of the liquid crystal composition is not substantially influenced by the light-scattering effect exerted by the flat, plate-shaped particles. However, if the flat plate-shaped particles 13 should be present at a density such that they substantially influence the light transmittance of the liquid crystal composition, the light transmittance in both of the light scattering states shown in FIG. 7A and the transparent state of FIG. 7B would be lowered for a quantity corresponding to the light-scattering effect exerted by the randomly aligned and dispersed particles 13. Thus, in short, the light transmittance of the cell would be slightly reduced.

Conclusively, a liquid crystal composition according to the eighth aspect of the present invention is capable of providing a temperature-sensitive light shutter which autonomously controls the light transmittance.

According to the ninth aspect of the present invention, provided is not only a temperature-sensitive light shutter which autonomously controls the light transmittance as described in the eighth aspect, but also a colored light shutter.

DETAILED DESCRIPTION OF THE
PREFERRED EMBODIMENTS

The liquid crystalline compounds useful in the present invention are not particularly limited and include all phases and all mixtures.

The liquid crystal for use in the first and the second aspect of the present invention may be selected, depending on the purpose of usage, from any one or a mixture of known liquid crystals including those enumerated below for use in the third to the seventh aspect, or from those for use in the sixth and the seventh aspect of the present invention.

The liquid crystal for use in the third to the seventh aspect of the present invention comprises any one or a mixture of known electric field sensitive liquid crystal molecules having positive dielectric anisotropy as the principal components thereof. Such liquid crystal molecules include, representatively, nematic liquid crystal molecules expressed by chemical formulae shown in FIGS. 8 to 24, cholesteric liquid crystal molecules expressed by formulae given in FIGS. 25 to 33, and smectic liquid crystal molecules expressed by formulae illustrated in FIGS. 34 and 35.

Figure 8:
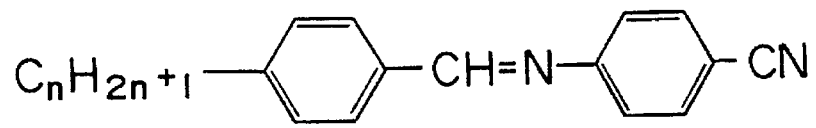
Figure 9:
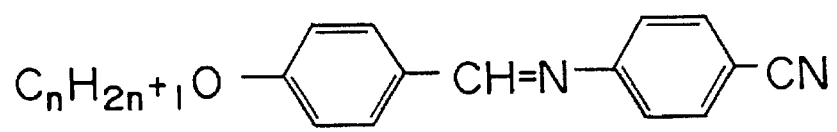
Figure 10:
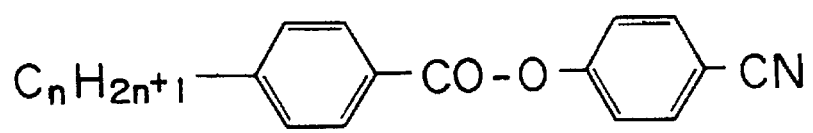
Figure 11:
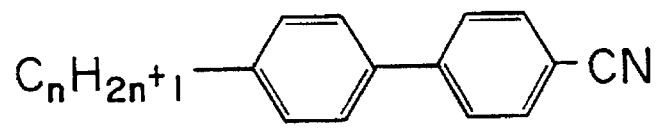
Figure 12:
Figure 13:
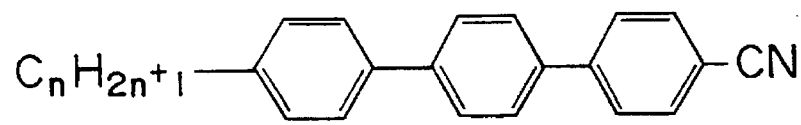
Figure 14:
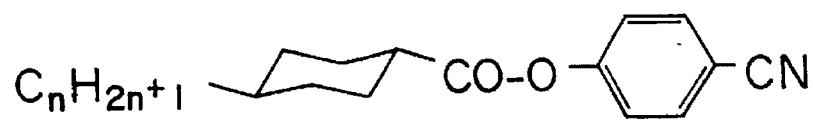
Figure 15:
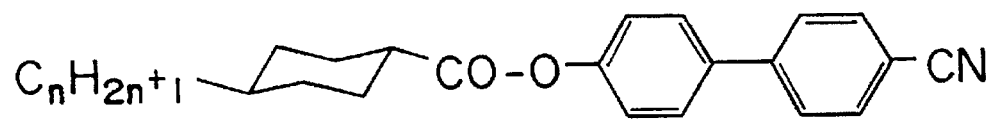
Figure 16:
Figure 17:
Figure 18:
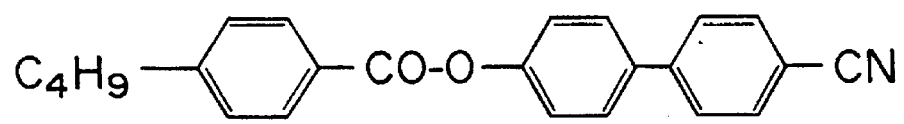
Figure 19:
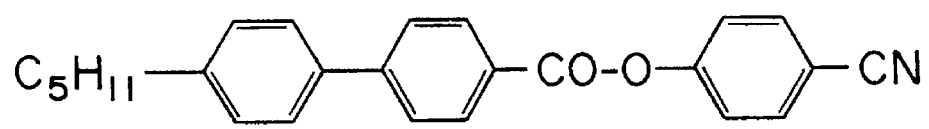
Figure 20:
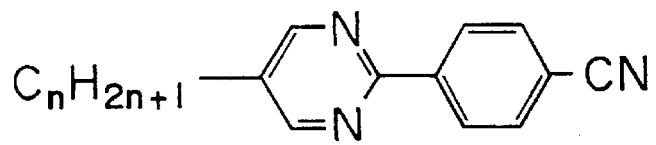
Figure 21:
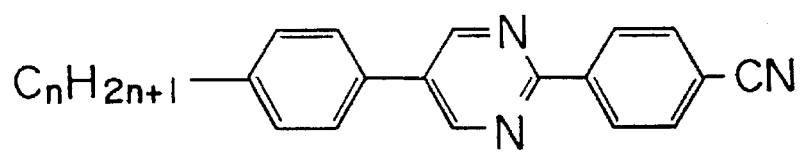
Figure 22:
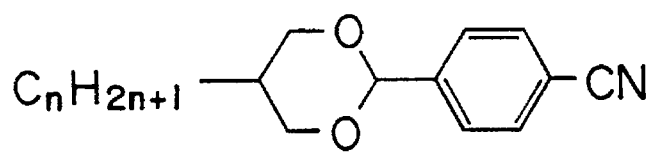
Figure 23:
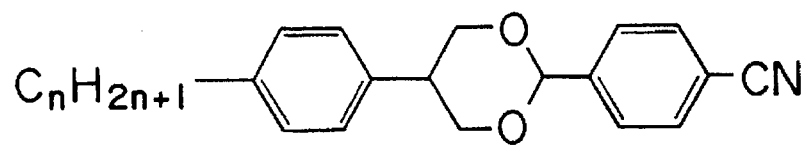
Figure 24:
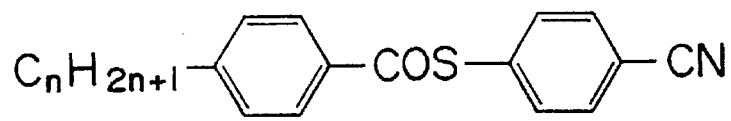
Figure 25:
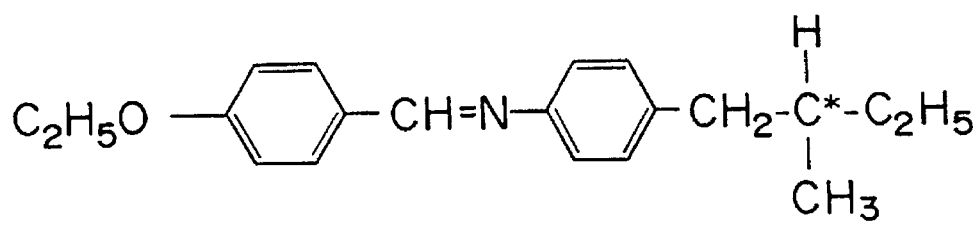
Figure 26:
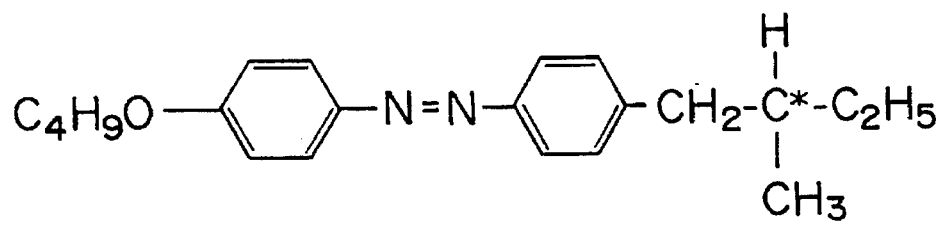
Figure 27:
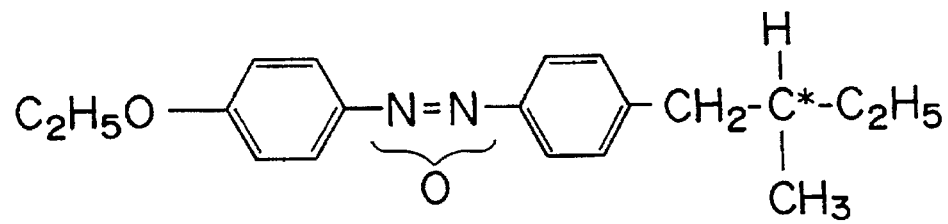
Figure 28:
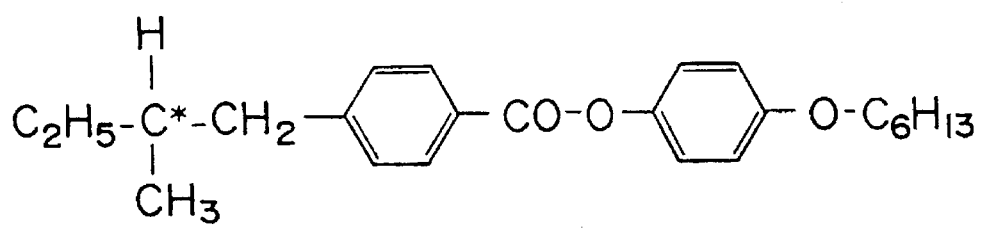
Figure 29:
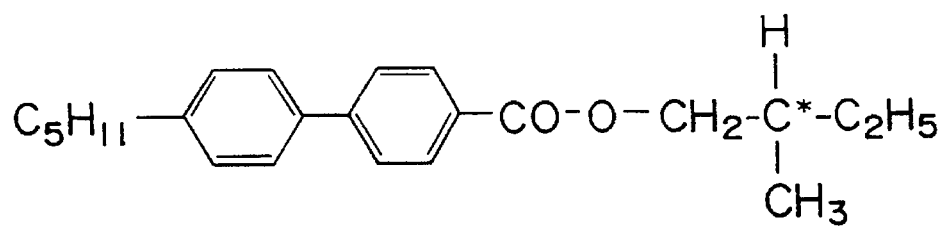
Figure 30:
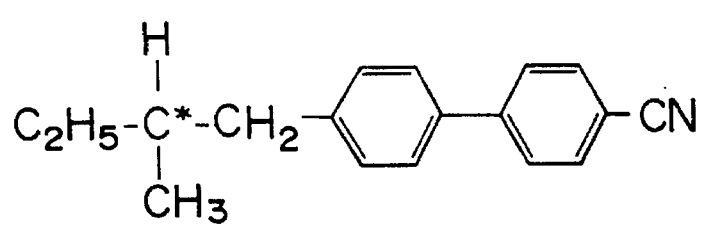
Figure 31:
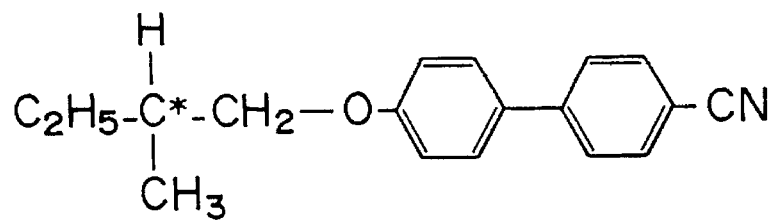
Figure 32:
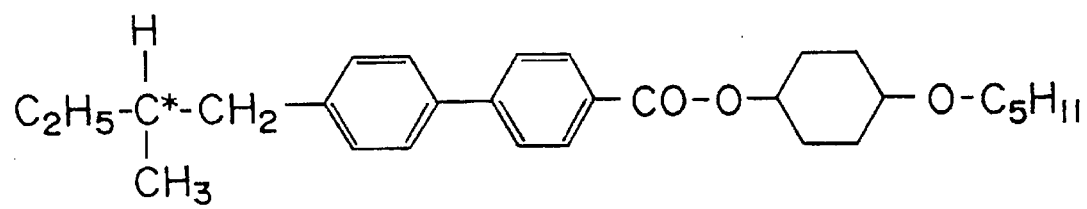
Figure 33:
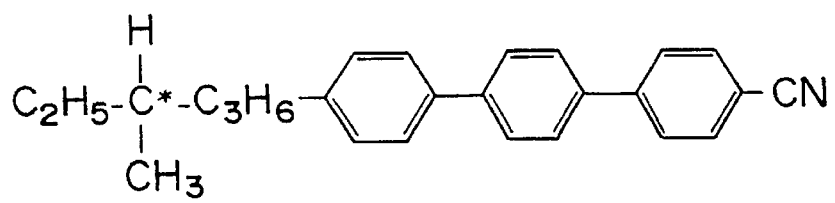
Figure 34:
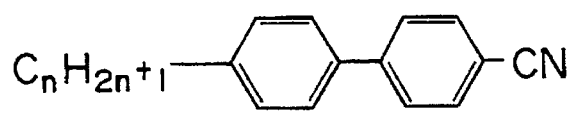
Figure 35:
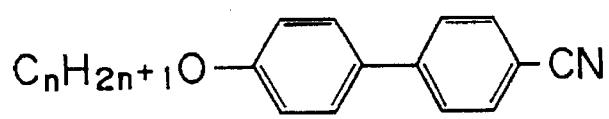

Among the liquid crystal molecules shown in FIGS. 8 to 35, n in the formula of FIG. 8 represents an integer of from 3 to 8; similarly, n represents an integer of from 4 to 8 in FIG. 9; an integer of from 6 to 8 in FIG. 10; an integer selected from a group consisting of 3, 4, 6, 7, 8, and 10 in FIG. 11; an integer selected from a group consisting of 3, 5, 7, 9, and 10 in FIG. 12; an integer selected from a group consisting of 3, 4, 6, and 7 in FIG. 13; an integer selected from a group consisting of 3, 4, 6, and 8 in FIG. 14; an integer selected from a group consisting of 2, 3, and 4 in FIG. 15; one selected from a group consisting of integers from 2 to 7 in FIG. 16; an integer selected from 3 and 5 in FIG. 17; an integer selected from 5 and 7 in FIG. 20; an integer selected from 4 and 6 in FIG. 21; an integer selected from 4, 6, and 8 in FIG. 22; 6 in FIG. 23; an integer selected from 3 and 5 in FIG. 24; and one selected from a group consisting of integers from 8 to 12 in FIGS. 34 and 35.

A type of liquid crystal molecule having a small positive dielectric anisotropy, or any of those having a negative dielectric anisotropy as exemplified in FIGS. 36 to 64 below can be used as well so long as they are mixed with the aforementioned liquid molecules expressed by formulae shown in FIGS. 8 to 35 to yield a positive dielectric anisotropy as a whole.

Figure 36:
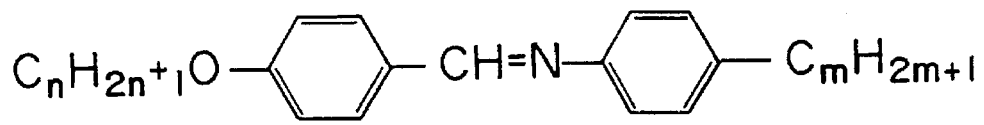
Figure 37:
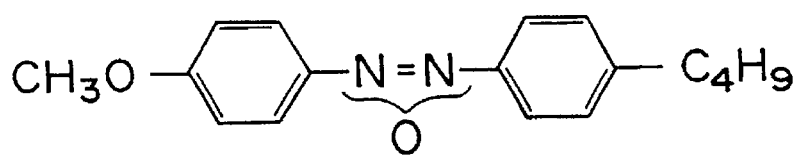
Figure 38:
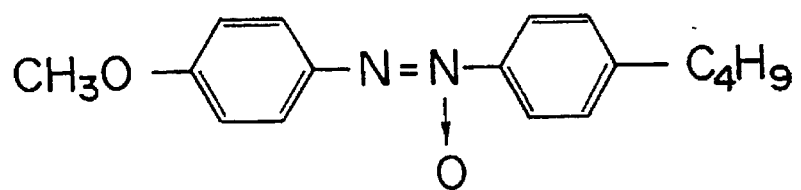
Figure 39:
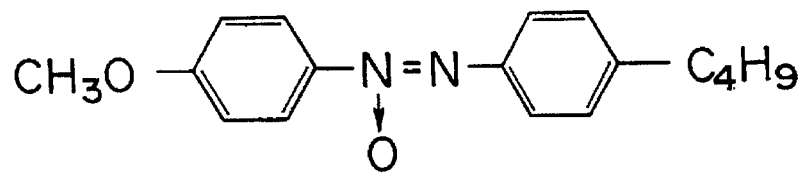
Figure 40:
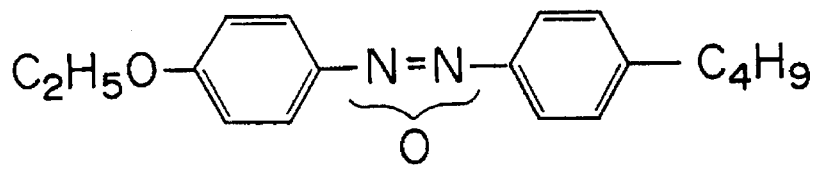
Figure 41:
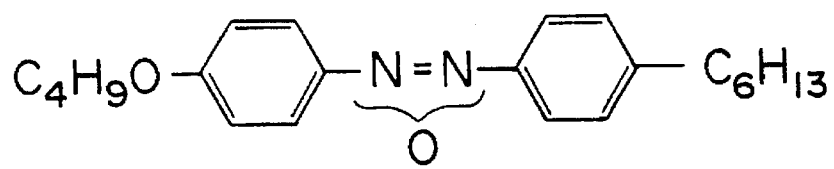
Figure 42:
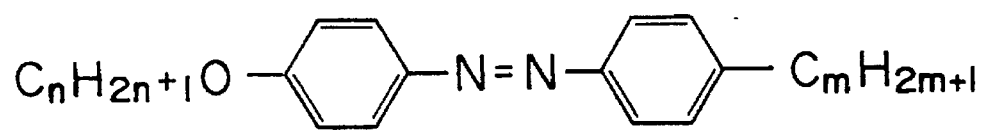
Figure 43:
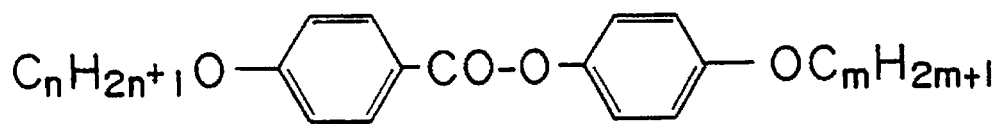
Figure 44:
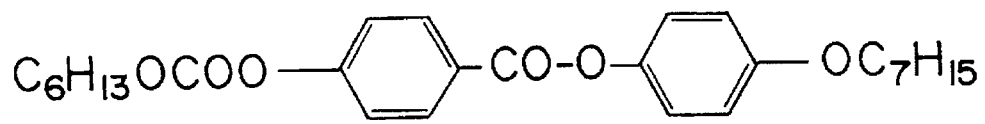
Figure 45:
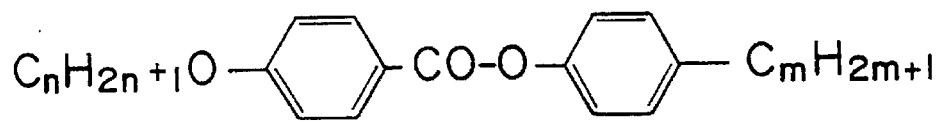
Figure 46:
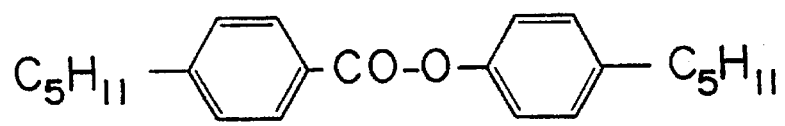
Figure 47:
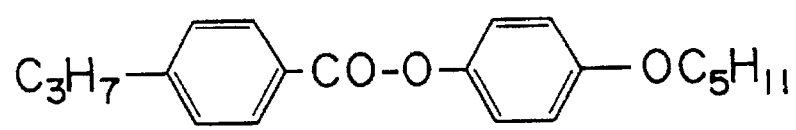
Figure 48:
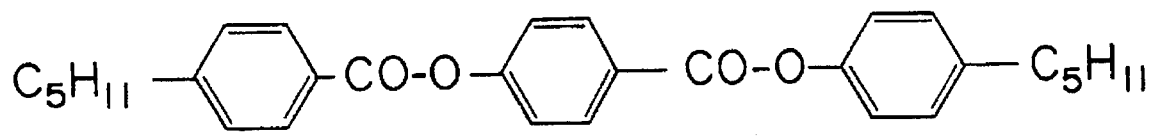
Figure 49:
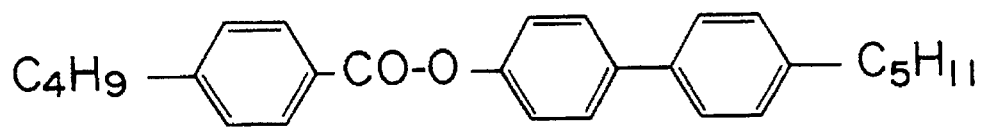
Figure 50:
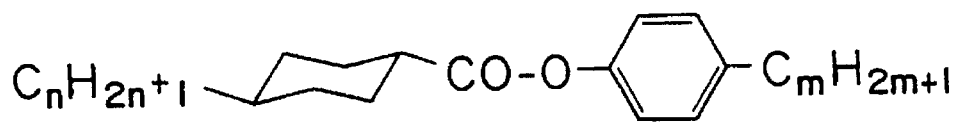
Figure 51:
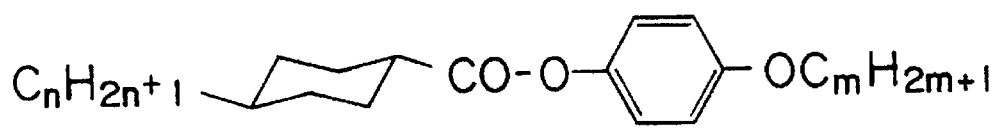
Figure 52:
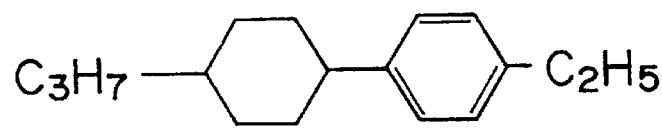
Figure 53:
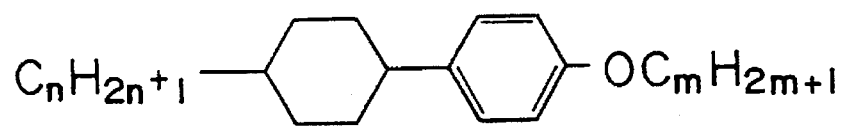
Figure 54:
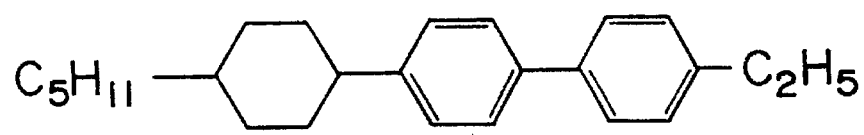
Figure 55:
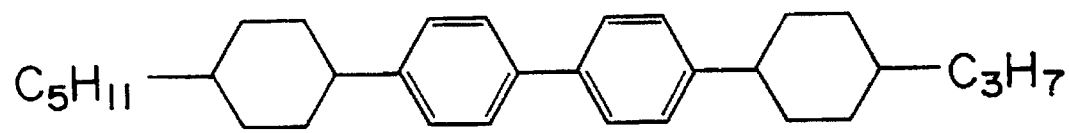
Figure 56:
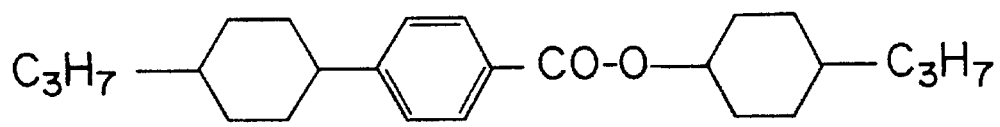
Figure 57:
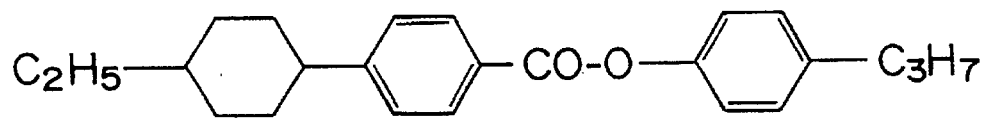
Figure 58:
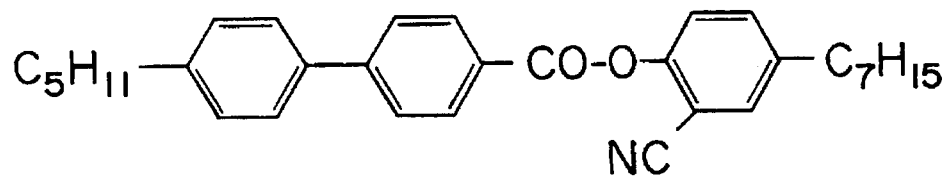
Figure 59:
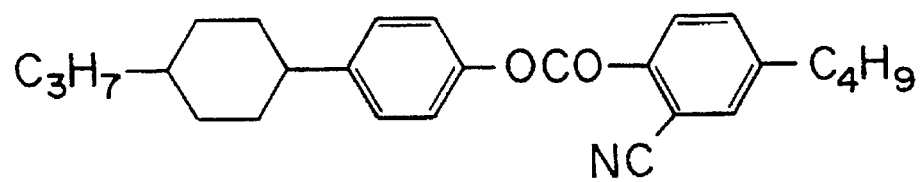
Figure 60:
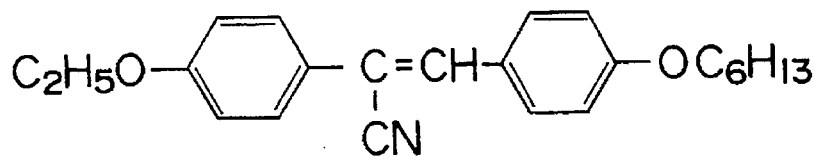
Figure 61:
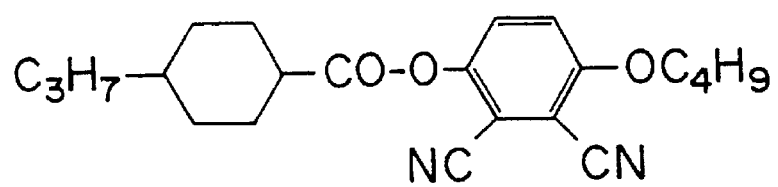
Figure 62:
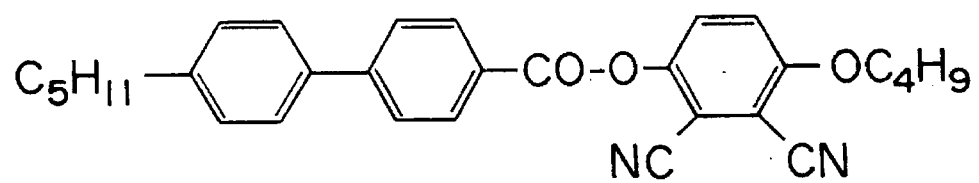
Figure 63:
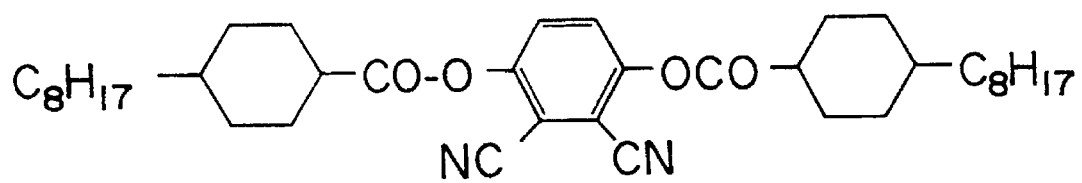
Figure 68:
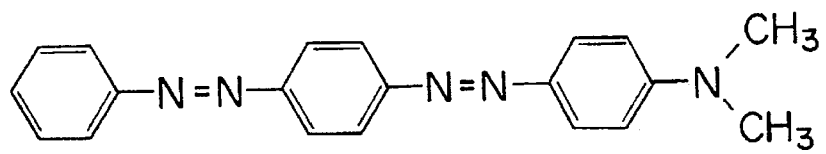
Figure 69:
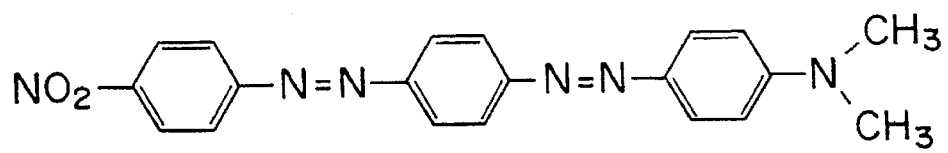
Figure 70:
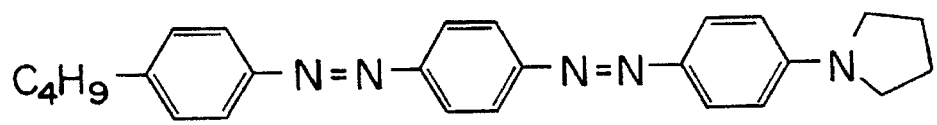
Figure 71:
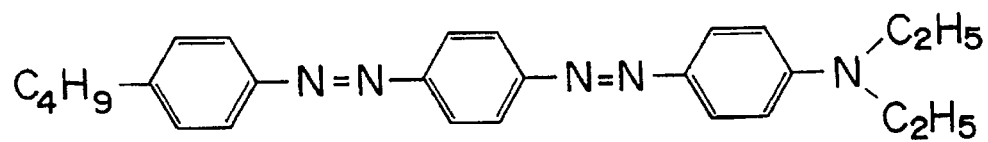
Figure 72:
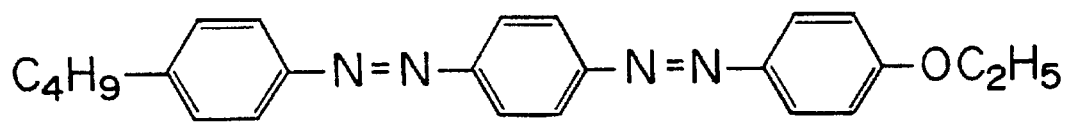
Figure 73:
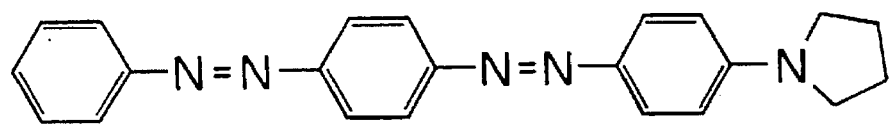
Figure 74:
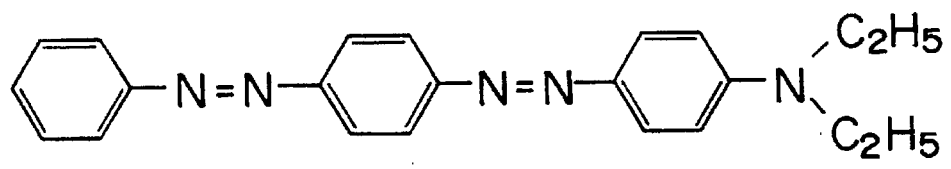
Figure 75:
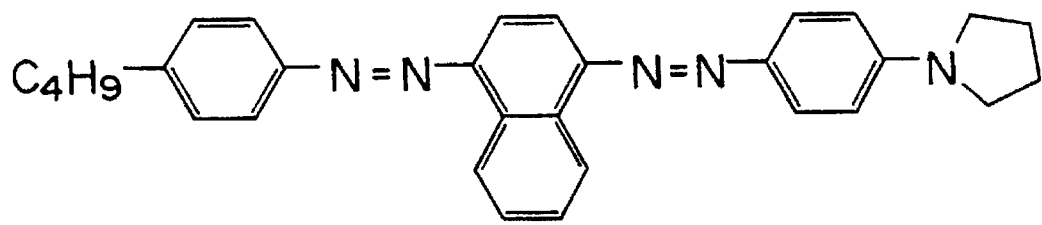

In the liquid crystal molecules expressed by formulae shown in FIGS. 36 to 64, in FIG. 36, n represents an integer of from 1 to 3, and when n is 1, m represents one selected from a group of integers from 3 to 6; when n is 2, m represents either 4 or 6; and when n is 3, m is 8. In FIG. 42, n is 1 and m is 5, or n is 6 and m is 4. In FIG. 43, n is 1 and m is 6, or n is 5 and m is 8. In FIG. 45, n is 1 and m is 5, or n is 6 and m is 9. In FIG. 50, n represents an integer of 4 or 5, and when n is 4, m represents one selected from a group of integers from 4, 6, and 7; when n is 5, m is 5. In FIG. 51, n represents an integer of from 3 to 5, and when n is 3, m represents an integer of 2 or 4; when n is 4 or 5, m represents either 2 or 5.

Considering the liquid crystalline phase of the liquid crystal molecules, preferred are those nematic or cholesteric from the viewpoint of their high sensitivity to electric field. However, smectic liquid crystal molecules having electric field sensitivity, such as those illustrated in FIGS. 34 and 35, are also usable.

Among the electric field sensitive liquid crystals having positive dielectric anisotropy, preferred are those capable of undergoing phase change from a liquid crystalline state to an isotropic state in a temperature range in which an ordinary light-controlling element is used, because the application fields of the liquid crystal composition can be extended, and because the durability of the liquid crystal composition as well as that of the device using the same can be improved. Although it is difficult to fix the temperature range uniquely because it differs depending on the usage of the liquid crystal composition, however, in general, it is in a range of from $-10°$ to $60°$ C. or a temperature range in the vicinity thereof. A large number of liquid crystals comprising the liquid crystal molecules enumerated above in FIGS. 8 to 64 or of those comprising a mixture of two or more selected therefrom yield the phase transition temperature in this range.

In the embodiments according the present invention, also usable are the electric field sensitive liquid crystals having positive dielectric anisotropy, but which undergoes phase transition from a liquid crystalline state to an isotropic state at a temperature in a range partly or wholly falling out of the normal temperature range specifically mentioned above.

Among the electric field sensitive liquid crystals having a positive dielectric anisotropy, more preferable are those comprising lower molecular weight liquid crystals, because the response of the liquid crystal to the change in electric field can be further improved, and because the threshold voltage can be thereby set at lower value. The liquid crystals of a lower molecular weight as referred herein are those having a molecular weight of 1,000 or less. Examples of the lower molecular weight liquid crystal molecules include most of those enumerated above in reference with FIGS. 8 to 64.

In the embodiments of the present invention, however, electric field sensitive liquid crystals having positive dielectric anisotropy but comprising liquid crystal molecules having a higher molecular weight can be used as well.

The liquid crystal may be composed of a single type of liquid crystal molecule, or may be a mixture of two or more types. However, from the viewpoint of ease in forming a liquid crystalline phase over a wide temperature range, in general, the latter type is preferred. Mentioned as an example of a liquid crystal composed of a mixed type is such comprising 60% (molar) of a liquid crystal illustrated in FIG. 46 (wherein n is 1 and m is 4) and 40% (molar) of a liquid crystal of FIG. 46 (wherein n is 2 and m is 4).

With reference to the sixth and the seventh aspect of the present invention, it is preferred to use as the electric field sensitive liquid crystals having a positive dielectric anisotropy, from the viewpoint of preservability of the recorded information, those which undergo phase transition between a liquid crystalline state and an isotropic state at a temperature higher than the normal working temperature under which an ordinary recording medium is used. Otherwise, if the working temperature should be extremely increased, the entire liquid crystal composition may be converted into a recording state. The range for the normal working temperature cannot be defined uniquely because it differs depending on the usage of the recording medium. However, in general, it is in a range of from $-10°$ to $60°$ C. or a temperature range in the vicinity thereof. A large number of liquid crystals comprising the liquid crystal molecules enumerated above in FIGS. 8 to 64 or of those comprising a mixture of two or more selected therefrom yield the phase transition temperature in this range. The liquid crystal for use in the eighth and the ninth aspect of the present invention may be or may not be electric field sensitive. The liquid crystal molecules may be such having a positive dielectric anisotropy or such of a negative dielectric anisotropy. There is no particular restriction concerning the temperature at which the liquid crystal undergoes phase transition between a liquid crystalline phase and a crystalline phase, however, preferably, the phase transition point preferably falls in a temperature range generally used as a standard in normal air conditioning. The "standard temperature range" differs depending on the purpose of air conditioning, however, for example, it is from $-10°$ to $60°$ C., and more preferably, from $10°$ to $40°$ C.

Liquid crystals having a temperature difference between the phase transition points for the crystalline-liquid crystalline phase transition and the liquid crystalline-isotropic phase transition of at least $20°$ C. or more are particularly preferred.

Examples of liquid crystals having a crystalline-liquid crystalline phase transition point ($T_{CN}$) in a temperature range of from $20°$ to $60°$ C. and a temperature difference between the crystalline-liquid crystalline phase transition point and the liquid crystalline-isotropic phase transition point ($T_{NI}$) of at least $20°$ C. or even more are enumerated below:

a compound of formula expressed in FIG. 36 wherein n is 1 and m is 4, having a $T_{CN}$ of $22°$ C. and a $T_{NI}$ of $47°$ C.;

a compound of formula expressed in FIG. 36 wherein n is 1 and m is 5, having a $T_{CN}$ of $38°$ C. and a $T_{NI}$ of $58°$ C.;

a compound of formula expressed in FIG. 36 wherein n is 2 and m is 4, having a $T_{CN}$ of 37° C. and a $T_{NI}$ of 80° C.;

a compound of formula expressed in FIG. 36 wherein n is 2 and m is 6, having a $T_{CN}$ of 39° C. and a $T_{NI}$ of 80° C.;

a compound of formula expressed in FIG. 36 wherein n is 3 and m is 8, having a $T_{CN}$ of 32° C. and a $T_{NI}$ of 60° C.;

a compound of formula expressed in FIG. 8 wherein n is 4, having a $T_{CN}$ of 38° C. and a $T_{NI}$ of 62° C.;

a compound of formula expressed in FIG. 8 wherein n is 5, having a $T_{CN}$ of 46° C. and a $T_{NI}$ of 75° C.;

a compound of formula expressed in FIG. 8 wherein n is 6, having a $T_{CN}$ of 33° C. and a $T_{NI}$ of 65° C.;

a compound of formula expressed in FIG. 8 wherein n is 7, having a $T_{CN}$ of 32° C. and a $T_{NI}$ of 72° C.;

a compound of formula expressed in FIG. 12 wherein n is 5, having a $T_{CN}$ of 48° C. and a $T_{NI}$ of 68° C.;

a compound of formula expressed in FIG. 50 wherein n is 4 and m is 2, having a $T_{CN}$ of 35° C. and a $T_{NI}$ of 75° C.; and a compound of formula expressed in FIG. 50 wherein n is 4 and m is 5, having a $T_{CN}$ of 29° C. and a $T_{NI}$ of 66° C.

The particles and, especially, flat plate-shaped particles as a second substance in the first to ninth aspect of the present invention refer to those having a sufficiently large diameter or, especially, large aspect ratio. The particles need not be of plate-like shape, and they may have rod-like shapes or may be acicular. To efficiently form cell-structured domains in the liquid crystal composition, the aspect ratio in general is 2 or more, and more preferably, 5 or more.

The particles suitable for the formation of plural domains inside the liquid crystal composition are required to have a plate-like or at least a rod-like shape which has an aspect ratio of 2 or more, and more preferably 5 or more.

If the particles have a plate-like shape or a rod-like shape, their diameter or length is within the range of from 0.1 µm to 20 µm, and more preferably 5 µm or less. The particles with those sizes of 0.1 µm or less are not preferred, because they fail in effectively forming domains inside the liquid crystal composition. The particles with those sizes larger than 20 µm are not preferred, because such particles result in an unfavorable appearance due to the formation of a distinct non-uniform liquid crystal composition, and that in case where a thin-typed cell having a cell gap of several tens of micrometers is fabricated, their alignment may be physically disturbed.

The particles in a plate-like shape or a rod-like shape are required to have the following thickness or width with respect to the respective diameter or length so as to satisfy the aforementioned aspect ratio: the thickness or width of 10 µm or less, preferably 2.5 µm or less, as for the aspect ratio of 2 or more, and the thickness or width of 4 µm or less, preferably 1 µm or less, as for the aspect ratio of 5 or more.

Particularly, in the sixth and the seventh aspect of the present invention, particles 1 µm or less in diameter are preferred, because larger particles induce distinguished heterogeneity in the liquid crystal composition which impairs the recording precision and recording density.

There is no particular restriction concerning the material constituting the flat plate-shaped particles. However, in case flat plate-shaped particles undergo change in alignment upon application of an electric field, a material capable of causing the re-arrangement of the particles rapidly and clearly is preferred, because the functions and effects described in the foregoing can be clearly exhibited.

Preferred as the flat plate-shaped particles which undergo re-alignment in response to the application of an electric field are those of layered clay minerals, titanium oxide, alumina white (water-insoluble basic aluminum sulfate), calcium carbonate, flaky zinc oxide, flaky aluminum, Berlin blue, hematite oxides, and graphite, as well as the plate-like crystals of various types of ceramics. Also usable are those of organic crystals and organic metal complexes. Flat plate-shaped particles which do not undergo change in alignment by themselves can be used as well. Examples of the particles having low electric field sensitivity or almost no sensitivity include those of organic polymers, such as polyethylene, polypropylene, and polytetrafluoroethylene.

To maintain the response of the liquid crystal composition at a level equivalent to that of liquid crystal alone, the flat plate-shaped particles to be incorporated in the composition preferably interact with the liquid crystal molecules only through the interface between the two, and have no influence on the internal viscosity of the liquid crystal. Therefore, the particles should have affinity for the liquid crystal, because a particle having affinity for a liquid crystal interacts with a liquid crystal at the interface.

On taking the above requirements into consideration, preferred as materials for the flat plate-shaped particles are the layered clay minerals. Examples of the layered clay minerals include naturally occurring or synthesized montmorillonite, sapient, mica, and hectorite. Particularly preferred as a representative material from the viewpoint of ease in dispersing the particles in a liquid crystal is montmorillonite.

The flat plate-shaped particles are preferably dispersed at such a density that liquid crystal domains may be formed effectively. On the other hand, the presence of flat plate-shaped particles at a high density as such to mutually limit the rearrangement is not preferred. The optimal range of density as to satisfy the above requirements at the same time depends on the type, the size, etc., of the flat plate-shaped particles, and it can not be set uniquely. However, in general, the flat plate-shaped particles are preferably dispersed at a quantity of from 1 to 10 parts by weight with respect to 100 parts by weight of the liquid crystal. The same discussion applies to the case a layered clay mineral is used for the flat plate-shaped particles.

The flat plate-shaped particles inside the liquid crystal need not be completely dispersed in the liquid crystal in such a manner that each of the particles are completely isolated from each other. Several to several tens of particles may partially aggregate into a secondary particle without any problem if they as a whole are dispersed at such a degree that the functions and the effects described above for the flat plate-shaped particles are exhibited. For instance, particles of a layered clay mineral are dispersed in the liquid crystal in the form of aggregates consisting of several tens of primary particles (unit layers), however, the functions and effects of the flat plate-shaped particles are sufficiently exhibited.

To maintain the flat plate-shaped particles in the dispersed state above, the particles must have good affinity for the liquid crystal. The particles having good affinity for the liquid crystal are dispersed well in the liquid crystal rather than aggregate each other, because they interact with the liquid crystal at their interface. In case a type of an organic crystal or an organic metallic complex is used for the flat plate-shaped particles, the flat plate-shaped particles can be used as they are because they themselves have affinity for the liquid crystal. However, for example, when an inorganic compound having poor affinity for the liquid crystal such as a layered clay mineral is used for the flat plate-shaped particles, the particles are preferably subjected previously to a treatment to impart thereto sufficient affinity for the liquid crystal. The treatment can be generally effected by rendering the particles organic-compatible by, for example, adsorbing or covalently bonding organic compounds to the surface of the particles, such as hydrophobic siloxanes.

When layered clay minerals are used for the flat plate-shaped particles, in particular, affinity for liquid crystal can be effectively imparted to the particles by effecting an ion exchange treatment. That is, because alkaline metal interlayer ions are present, these ions may be replaced by organic ions such as onium ions having affinity for liquid crystal molecules, or by onium ions having liquid crystal groups attached. By thus rendering the layered clay mineral surface substatially organic, sufficient affinity for liquid crystal can be imparted thereto.

The kind of the onium ions above are preferably those having excellent affinity for liquid crystal molecules. Accordingly, an onium ion most suitable for the liquid crystal to be used in the composition is selected. Included as representative ions are alkylammonium ions. Another advantage in using organic onium ions is that the surface characteristics, electric properties, optical properties, dispersibility, response to electric field, etc., of the layered clay mineral can be controlled in various manners.

A composition of a liquid crystal and flat plate-shaped particles having affinity therewith can be prepared by simply mixing the two. However, a uniform mixture can be obtained by mixing the two in a common solvent, and then removing the common solvent. The same can be said in preparing a composition of a liquid crystal and particles of a layered clay mineral.

Any type of dichromatic dyes can be used in the first, the second, and the fifth aspect of the present invention so long as the spectrum change thereof is suitable for the end use. Thus, there is no particular restriction concerning the molecular shape and the crystal morphology thereof. However, the same discussion as that given for the flat plate-shaped particles applies, and dyes composed of rod-like particles and the like, i.e., those with a high aspect ratio, are preferred.

Figure 89:
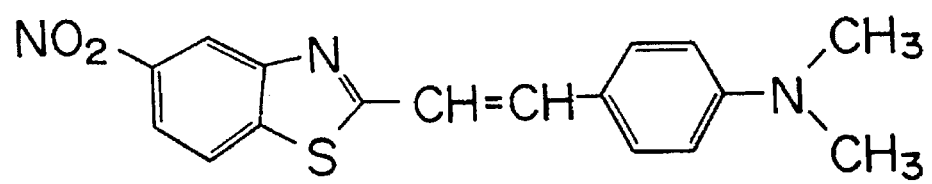
Figure 90:
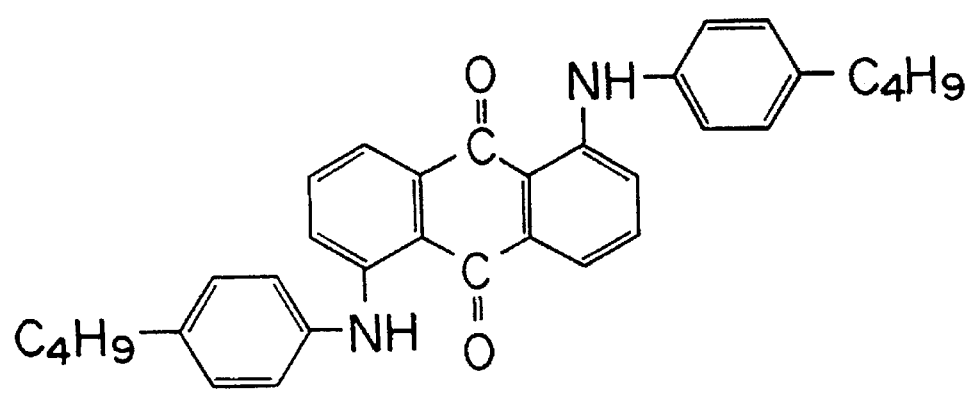
Figure 94:
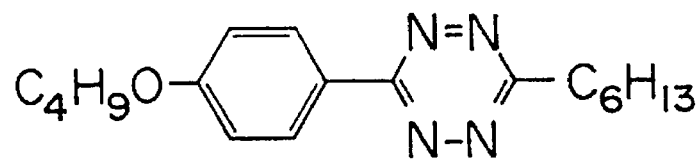
Figure 95:
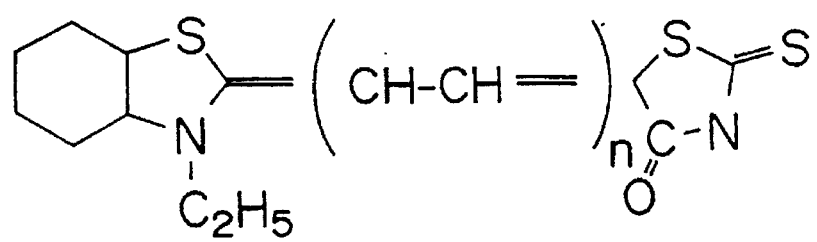

Any dichromatic dye can be used singly or in mixtures. Examples of preferred dichromatic dyes include azo-based dichromatic dyes expressed by the chemical formulae shown in FIGS. 65 to 84; azomethine dichromatic dyes expressed by formulae in FIGS. 85 to 88; a styryl dichromatic dye expressed by formula in FIG. 89; anthraquinone dichromatic dyes expressed by formulae in FIGS. 90 to 93; a tetrazine dichromatic dye expressed by formula in FIG. 94; and a merocyanine dichromatic dye expressed by formula in FIG. 95.

A dichromatic dye can be incorporated into the liquid crystal by dissolving the dye into the liquid crystal, representatively, in case of a dichromatic dye miscible with a liquid crystal.

However, irrespective of whether a dichromatic dye is miscible with liquid crystal or not, it is also effective to incorporate the dye by adsorbing it to the surface of the flat plate-shaped particles, or, in case a layered clay mineral is used for the flat plate-shaped particles, intercalating a dichromatic dye having, e.g., an onium ion, with the flat plate-shaped particles through an ion exchange treatment. In such cases, the alignment of the dichromatic dye depends on the alignment of the flat plate-shaped particles or the layered clay mineral. Accordingly, the dichromatic dye should be adsorbed or intercalated in parallel with, or approximately in parallel with the direction of the major axis of the flat plate-shaped particles or the layered clay mineral.

The dichromatic dye may be incorporated by selectively utilizing one of the three methods above, or by simultaneously effecting two or more selected from the methods.

The liquid crystal composition of the present invention may contain in addition to the aforementioned liquid crystal, flat plate-shaped particles, and dichromatic dyes, an additive component which may be incorporated in a known liquid crystal or a liquid crystal composition by a known means, so long as the object of the present invention is not impaired by the addition thereof. Examples of such additives include a liquid crystal modifier such as a stabilizing agent, a viscosity controller such as a tackifier or a viscosity reducer, and an organic onium salt.

In an embodiment according to the first, the second, and the fifth aspect of the present invention, the liquid crystal composition of the present invention may be used freely for any purpose, for any use, and in any desired type of device.

An example using the liquid crystal composition of the present invention as a light-scattering-type light-controlling material comprises fabricating a cell by preparing a pair of substrates made of a glass or a transparent film of a synthetic resin and providing thereon a transparent electrode made of indium tin oxide (ITO) and the like, disposing the pair of substrates opposed to each other with spacers incorporated therebetween, and sealing a liquid crystal composition between the substrates. It is also possible to fabricate a plurality of cells simultaneously by providing transparent electrodes on both sides of a transparent polymer matrix having therein a plurality of pores, and sealing a liquid crystal composition inside the pores of the matrix. Furthermore, a temperature control means or a means for applying a shearing force such as vibration or impact may be attached to the thus fabricated cell or the matrix including the cells.

In the light-controlling element according to the fourth aspect of the present invention, the hollow cell comprises at least a colorless or a colored transparent material for the light-transmitting portion. Thus, in case the light-controlling element is of a transparent type, the wall portions provided to the inlet and the outlet of transmitting light are transparent. In case the light controlling element is of a light reflection type such as a display or a mirror, the wall portion irradiated by an incident light is transparent, but the wall portion provided for reflecting light is opaque or light-reflecting.

The term "transparent" as used herein does not signify a state of absolute transparency, but signifies a relative state which is light-transmitting depending on the purpose of using the light-controlling element, or at least light transmitting in the desired range. Accordingly, terms related thereto, for instance, "a low light transmittance" or "opaque", do not signify a state completely shielded from light or an absolutely opaque state, but are to be defined relatively in relation with the meaning of the term "transparent".

The hollow portion to be filled with the liquid crystal composition must have a gap of a proper width in the direction of transmitting light. The width of the gap depends on the purpose of the light-controlling element or the size of the domains that are formed in the liquid crystal composition; however, it may be set in a range of, for example, from several to several tens of micrometers, or to a length corresponding to about several times of the diameter of a domain.

There is no particular restriction concerning the area for the hollow portion of the cell (i.e., the size of the direction perpendicular to the incident light). For example, it may be as large as a windshield of an automobile. The cell is fabricated in such a manner as to be extended over a wide area, or may be divided into a plurality of smaller subcells by using partitions. The cell of a latter type is advantageous in some aspects; in case a cell is destroyed, the liquid crystal composition can be prevented from leakage even if the entire cell were to be covered by a single pair of electrodes. Furthermore, if electrodes capable of turning ON and OFF the subcells individually are provided, if not to all but to every constant number of subcells, the light transmittance can be set independently for each of the cell portions. There is no particular restriction concerning the material, the shape, and the size of the cell or a hollow portion thereof except for those described above.

The means for applying an electric field to a light-controlling element according to the fourth aspect of the present invention is a means capable of applying an electric field to the liquid crystal composition charged inside the cell of the light-controlling element, and is generally a pair of electrodes. Because a liquid crystal having a positive dielectric anisotropy is used for the liquid crystal of the liquid crystal composition, the pair of electrodes is placed at a position in a hollow cell corresponding to the upper part of the direction of light incidence.

It is also possible to use a liquid crystal having negative dielectric anisotropy in the liquid crystal composition, while providing the pair of electrodes on wall portions opposed to each other and in the upper position in a direction perpendicular to that of light incidence. However, several considerations must be accomodated before implementing a cell of this constitution, including the distance between the electrodes when a wide cell is fabricated, and controlling the alignment of electric field sensitive flat plate-shaped particles.

The electrodes are provided in such a manner that the electric field may be applied effectively to the whole cell, and that they do not interfere the transmitted or the reflected beam of light. In general, a transparent sheet electrode is used to cover the entire area of the hollow cell corresponding to the portion filled with the liquid crystal composition. More specifically in this case, for example, an ITO electrode is adhered to the glass sheet and the like constituting the wall portion of the cell. In this case again, if the light-controlling element is of a light reflection type, the electrode provided to the wall portion of the light reflecting side need not be transparent.

In the light-controlling element of the fourth aspect, the means for releasing it from its memory functions to disintegrate the domains formed in the liquid crystal composition. A first means for releasing the element from the memory state is to control the temperature of the liquid crystal composition, and a second means is to apply a shearing force to the liquid crystal composition.

The means for controlling the temperature of the liquid crystal composition may be, for example, a transparent heat radiant body adhered to the wall portion of the cell or simply capable of applying heat thereto. However, any other means for controlling the temperature may be used, so long as the means can be used with the element and the temperature being controlled by a simple means, and as the control rate is in a favorable range. It is also possible to add an electrolyte at a predetermined concentration, and a current may be applied thereto to control the temperature.

The liquid crystal composition heated to the isotropic temperature can be cooled to the liquid crystalline temperature by natural cooling or by providing any proper cooling means such as refrigeration, etc.

Figure 101:
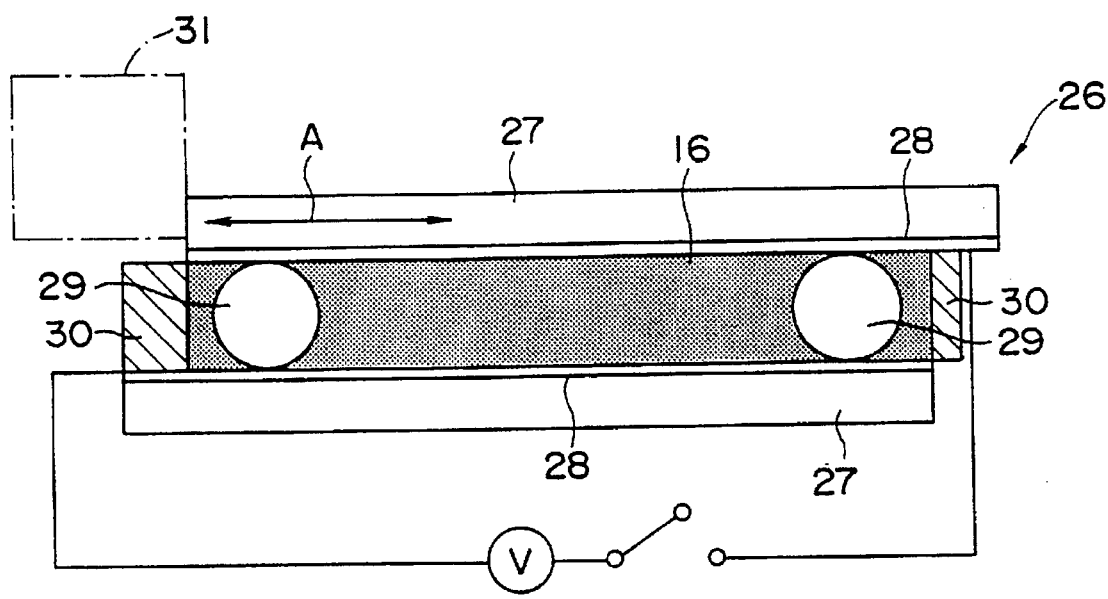
FIG. 101 is a scheme showing the constitution of a light-controlling cell.

Shearing force can be applied to the liquid crystal composition most effectively by applying a shear stress. An embodiment is shown schematically in FIG. 101. The point in the embodiment with reference to FIG. 101 is the wall portion constituting the cell of the light-controlling element which is slidable in the horizontal direction.

That is, the cell comprises a pair of transparent glass plates 26 and 27 having thereon ITO electrodes disposed opposed to each other with spherical spheres incorporated therebetween as spacers 29, so that a constant gap may be formed between the glass plates and that the spacers may function as rolls. Rubber sealing members 6 are fixed along the edges of the glass plates 26 and 27 to prevent leakage of a liquid crystal composition 16. An actuator 31 is attached to the glass plate 26 to slide the glass plate 26 in the direction indicated by an arrow A in the figure. In this manner, a shearing force is applied to the thin layer of the liquid crystal composition 16 sealed between the glass plates. The actuator 31 for use in the embodiment may be of any type capable of driving the glass plate 26 in the manner above. However, for example, a type using a magnetic force to reciprocate a driving core, or a type using a piezoelectric element as the driving material may be used to further improve response, precision in shear movement, etc.

Other means for imparting shearing force to the liquid crystal composition comprise, for example, means using an impact member to apply an impact to the cell, means for applying ultrasonic vibration to the cell filled with the liquid crystal composition, or means of applying a low frequency vibration to the cell filled with the liquid crystal composition. There is no particular restriction concerning the details for implementing them, and various types known in the art are usable.

The constitution of a hollow cell of the seventh aspect according to the present invention is similar to that referred in the fourth aspect of the present invention.

In the recording element of the seventh aspect, the information recording means is capable of elevating the temperature of the particular portions of the liquid crystal composition in the recording medium to an isotropic temperature to thereby realize a transparent state therein well distinguished from the rest of the portions. Accordingly, any means capable of heating the particular portions of the liquid crystal composition can serve as the information recording means. For example, a thermal head or a laser head emitting laser radiation is a representative information recording means which can be implemented easily inclusive of the operation and control systems therefor.

To obtain clearly recorded information, a heating means capable of providing a clear boundary between the heated portion and the non-heated portion is preferred. To increase the recording density, more preferable is a means capable of heating a narrower area of the liquid crystal composition in a spot-like manner. From these points of view, the aforementioned thermal heads and laser heads are suitable for the information recording means. The information recording means can be switched arbitrarily from a heating mode to a non-heating mode, and is equipped with a mechanism which freely moves the position of the heating head over the cells of the recording medium depending on the content of the information to be recorded.

In the recording element of the seventh aspect, the record erasing means is capable of canceling the distinct transparent state realized by the information recording means. A representative means having this function is a pair of electrodes capable of applying an electric field. The pair of electrodes is preferably provided on the wall portions disposed opposed to each other in the direction perpendicular to that of light incidence. The means for applying an electric field as described herein as the record erasing means can be used for converting the liquid crystal composition in a cell from its initial state to a recordable state.

The pair of electrodes is provided, in general, over an area wholly covering the cell portion filled with the liquid crystal composition. In case a wide cell is formed, or in case a plurality of cells are provided in the width direction with partitions provided among them, a plurality of electrodes may be provided correspondingly in every unit of area, or in every sectioned cell. Preferably, the plurality of electrodes are provided in such a manner that switching of an electrode ON and OFF is individually controllable.

The recording element according to the fifth aspect of the present invention may or may not be equipped with a readout means for reading out the distinguished transparent state as information. In case the recording element is not equipped with a record readout means, the recorded information is read out visually.

The record readout means reads out the recorded information in the form of a difference in light reflectance or light transmittance by irradiating an incident light to a recording medium or a cell of a recording element, or by using a sunlight or a light from an interior lighting fixture, and capturing a transmitted or a reflected light from the particular portion of the liquid crystal composition that is in a recording state or a recordable state. Accordingly, the record readout means may or may not be equipped with a light source. A representative embodiment of a record readout means comprises a light source, a photoreceptor, and a processing means for the information received on the photoreceptor. There is no particular restriction concerning the type or the wavelength of light to be used for the light source, so long as the light can be processed by means of the photoreceptor.

The cell for use in a light shutter according to the ninth aspect is a hollow structure made from a transparent material, and the hollow portion thereof is filled with the liquid crystal composition. The cell may not be made of a completely transparent material, and it not necessary be made from a colorless material.

In case the shutter is used under such conditions that the incident light is too intense, the cell may be made from a semi-transparent material, for example, ground glass, which shields light to some extent. In case the design of the light shutter is taken into consideration, for example, a colored or patterned, transparent or semi-transparent glass can be used.

The material for use in the cell structure may be glass, plastics, etc. The cell may be formed generally into a flat panel having a large area, but the shape is not particularly limited thereto. In case a cell is shaped into a large flat panel, the gap in the hollow portion of the cell may be maintained using spacers. In addition to the crystal nucleating agent to be described hereinafter, the inner walls of the cell are preferably subjected to rubbing treatment and the like to allow crystal growth to proceed in a particular direction.

By using partitions, the hollow portion inside the cell may be divided into a plurality of small sub-cells each filled with the liquid crystal composition. In case each of the sub-cells are filled with liquid crystal compositions containing dyes differing in color, a light shutter cell having a colored pattern like a stained glass can be fabricated. Furthermore, if a part of the sub-cells may be destroyed, the leakage of the liquid crystal composition can be confined within an area of the cells underwent destruction. By thus dividing the cell into a plurality of sub-cells, the transition of the liquid crystal composition into crystalline state can be effected more rapidly and uniformly.

In the light shutter cell above, the hollow portion to be filled with the liquid crystal composition must be provided with a gap of a pertinent width in the direction of light transmittance. The gap must be provided according to the specific requirements depending on the purpose of using the light shutter, the domain size to be formed in the liquid crystal composition, etc., however, in general, for example, the gap is in a range of several to several tens of micrometers, or, is it set in a range of several to several tens of times larger than the diameter of the domains.

In the eighth and the ninth aspect of the present invention, the crystal nucleating agent is effective for rapidly and uniformly crystallizing the liquid crystal composition in case the liquid crystal composition inside the cell undergoes phase transition to the crystalline phase. Accordingly, the light transmittance can be changed rapidly and completely. Any type of crystal nucleating agent can be used, so long as it is a substance which serves as nuclei for the crystallization of liquid crystal composition. An alkylcyanoterphenyl can be mentioned as a representative example.

The crystal nucleating agent is used inside the cell by bringing it into contact with the liquid crystal composition. The nucleating agent can be used advantageously by applying or attaching a material containing the nucleating agent to the inner wall of the cell. In this case, the nucleating agent is provided on the inner wall portion approximately in parallel with the direction of light transmittance so that the presence thereof may not directly interfere with the transmitting light. Crystallization can be allowed to proceed advantageously in one direction by applying the nucleating agent to a pair of inner wall portions of the cell disposed opposed to each other.

In case the cell are divided into a plurality of sub-cells, the crystallization may be effected rapidly and uniformly inside each cell in case the liquid crystal composition undergoes phase transition to a crystalline phase by applying the crystal nucleating agent to the inner wall of each of the sub-cells.

EXAMPLES ACCORDING TO THE FIRST AND SECOND ASPECTS OF THE INVENTION

EXAMPLE 1

(1) Preparation of Organic-Compatible Montmorillonite

A 200-g portion of a high-purity sodium-montmorillonite (Na-montmorillonite) (having an ion-exchange capacity of 119 meq/100 g) obtained from bentonite of Yamagata prefecture, Japan, was dispersed in 3,500 ml of water, and was heated to 80° C. Separately, while heating and stirring, 48.8 g (262 mmol) of laurylamine were completely dissolved in water and 31.0 g of concentrated hydrochloric acid. The resulting solution of ammonium salt was added to the aqueous dispersion of Na-montmorillonite while vigorously stirring the mixture to find an agglomerate to form in the dispersion. Stirring was further continued for a duration of 30 minutes.

The agglomerate was recovered by filtration upon completion of the stirring, and was freeze-dried after washing it once with ethanol and three times with hot water. The resulting product was further dried in a vacuum at 80° C. to obtain a powder of organic montmorillonite containing laurylammonium. The resulting organic montmorillonite is referred to hereinafter as "laurylammonium montmorillonite".

27

(2) Preparation of Liquid Crystal Composition

A 1.0-g portion of 4-pentyl-4'-cyanobiphenyl liquid crystal (which undergoes phase transition from isotropic phase to liquid crystalline phase at a temperature of 35° C.) was dissolved into 1 ml of dimethylacetamide to obtain a uniform solution. Separately, 0.0124 g of laurylammonium montmorillonite (containing 0.0108 g of inorganic matter) were uniformly dispersed in 2 ml of dimethylacetamide. The resulting dispersion was uniformly mixed with the solution. Dimethylacetamide was removed from the mixed dispersion through evaporation by heating the dispersion at a temperature in the range of from 50° to 60° C. in a vacuum. By sufficiently stirring and mixing the product, the desired liquid crystal composition was obtained as a white paste.

(3) Microscopic Observation Using Crossed Nicol Prisms

The approximate particle size of the powder of laurylammonium montmorillonite dispersed in the isotropic liquid crystal composition obtained above was measured by microscopic observation under crossed nicol prisms. A polarization microscope "Model BHS-P" manufactured by Olympus Optical Co. Ltd. was used for the measurement. The results are given in Table 1.

(4) Fabrication of a Liquid Crystal Cell

Figure 96:
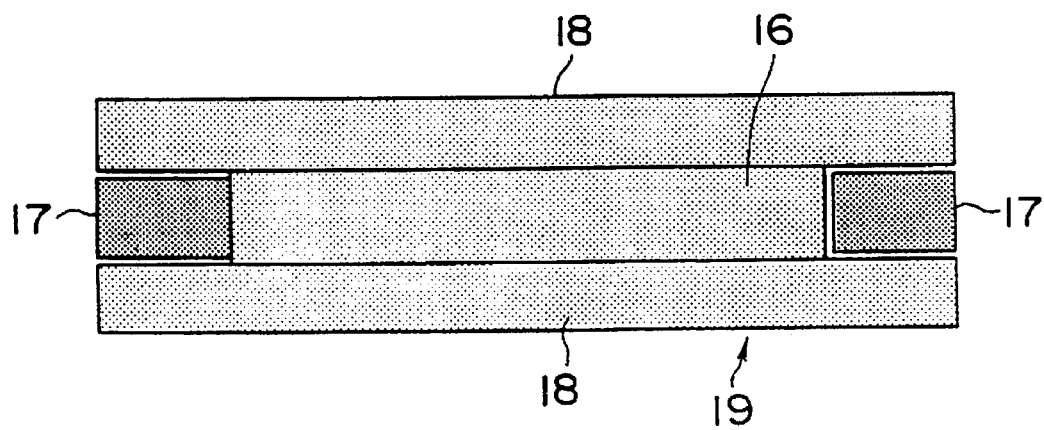
FIG. 96 is a scheme of a liquid crystal cell.

As shown in FIG. 96, a liquid crystal composition 16 was pressed and fixed between a pair of transparent glass substrates having thereon ITO by using polymer beads 17 having a diameter of 12 µm as spacers.

(5) Measurement of Light Transmittance

Figure 97:
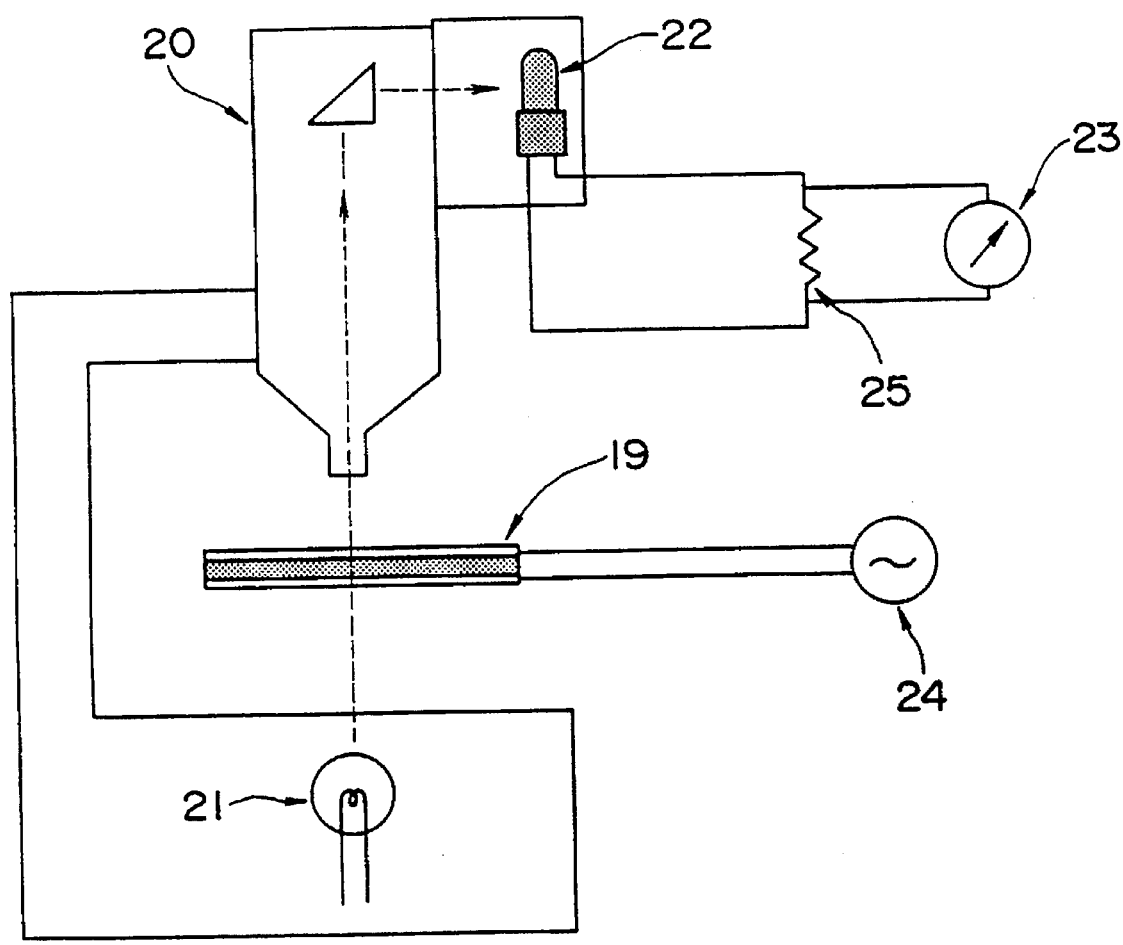
FIG. 97 is a diagram showing a measurement system for measuring light transmittance.

FIG. 97 shows the scheme of a system set up for use in the measurement of light transmittance. Referring to FIG. 97, the system comprises a polarization microscope 20 ("Model BHS-P", manufactured by Olympus Optical Co. Ltd.) as the optics, and a halogen lamp attached to the polarization microscope 20 as a light source 21. Transmitted light was detected by means of a photomultiplier 22 ("R-1547", manufactured by Hamamatsu Photonics Co., Ltd.).

Figure 98:
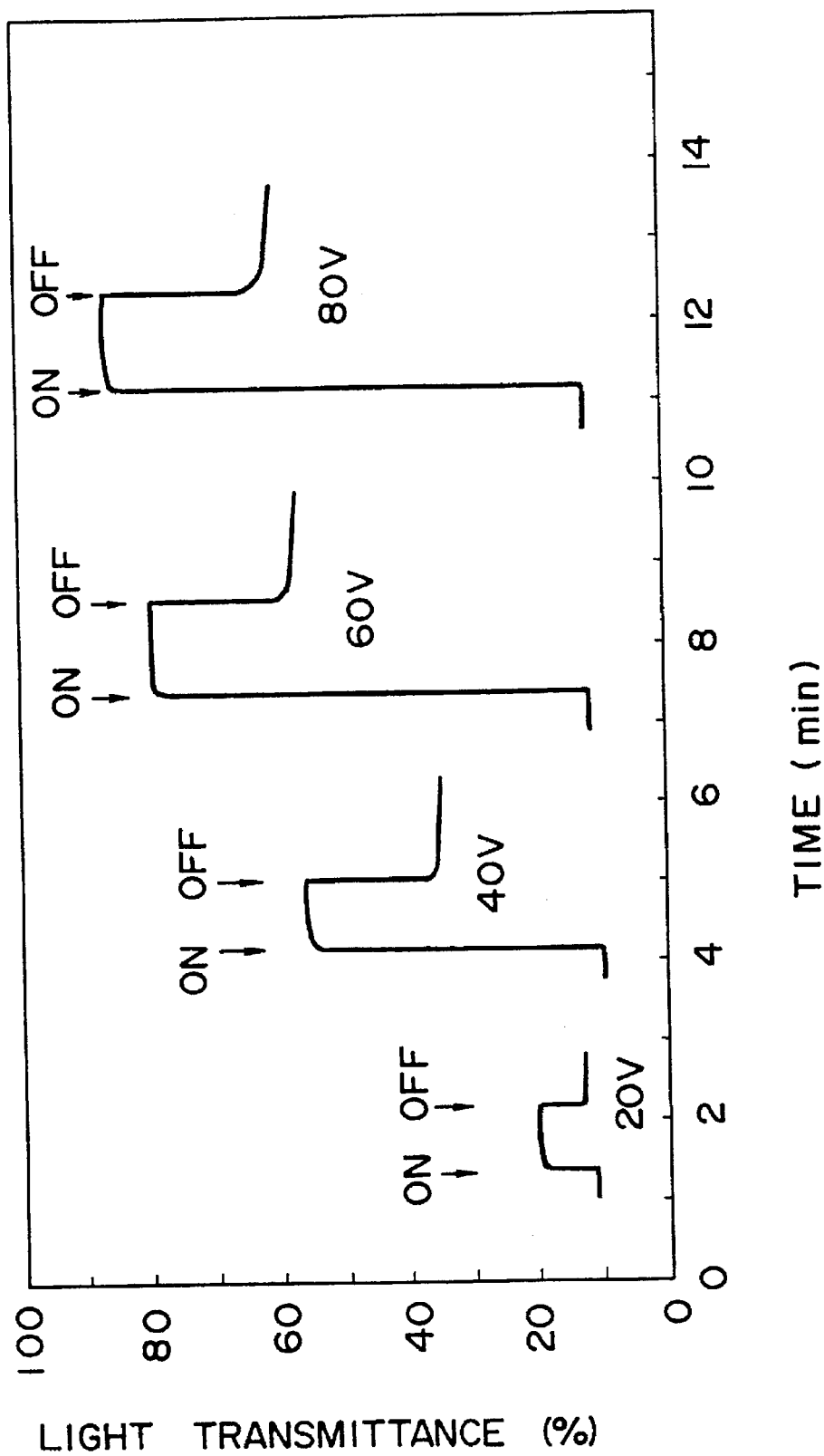
FIG. 98 is a graph showing the results obtained by measuring the response of light transmittance of a liquid crystal cell with a changing electric field.

The current output from the photomultiplier 22 was converted into voltage by serially connecting a 200-kΩ resistance 25, and was read on a pen recorder. The records on the pen recorder are given in FIG. 98 and in Table 1. Referring again to FIG. 97, "C448A" manufactured by Hamamatsu Photonics Co., Ltd. was used as the high-voltage DC power source 24, and "Multimeter TR6355" manufactured by Takeda Riken Co., Ltd. was used as the voltmeter 23. Voltage was applied to the cell by using a 100-V AC power source (60 Hz) through a slidac, thereby controlling the voltage applied to the cell at five levels, i.e., 0 V, 20 V, 40 V, 60 V, and 80 V.

The cell was observed under a polarization microscope to observe the change in the alignment of laurylammonium montmorillonite with the change in electric field applied thereto. The results corresponded with those of the clay mineral shown previously in FIG. 2.

(6) Response Time

Figure 99:
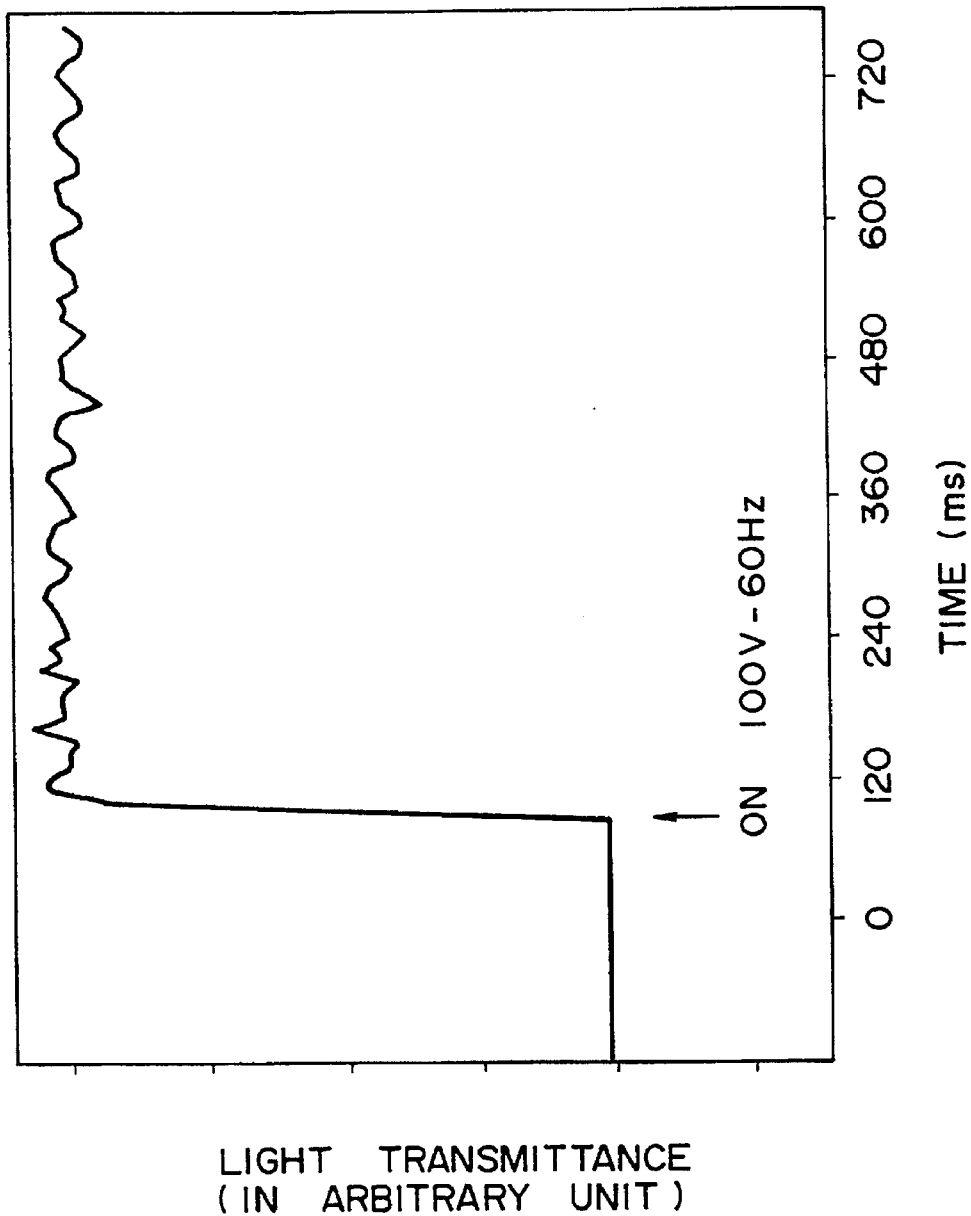
FIG. 99 is a graph showing the results obtained by measuring the response time of a liquid crystal cell with a changing electric field.

The response time of the liquid crystal cell above was measured by using a super-high sensitivity instantaneous multiphotometer system "IMUC-7000" manufactured by Otsuka Denshi K. K. The measuring conditions were set at a sampling time of 10 ms, an interval of 0 ms, and a measuring wavelength of 572 nm. A voltage of 70 V–60 Hz was applied instantaneously, and the change in output from the multiplier was measured with increasing duration of time. The response time corresponds to the time required for the change in output from 10% to 90%. FIG. 99 is a graph showing the change of the multiplier output with increasing time duration. Taking the sampling time of 10 ms into account, the response time thus obtained includes an error of about ±5 ms.

(7) Transmission X-ray Diffraction Analysis

A rotating anode X-ray diffractometer "RU-Z" manufactured by Rigaku Corp. was used. The transmission X-ray diffraction analysis was carried out using a cobalt (Co) Ka radiation at an applied tube voltage of 40 kV and a current of 150 mA, and using a slit system of 0.05° (DS)–0.15 mm (RS)–0.55° (SS). A sample of the liquid crystal composition (to be described in Example 3) was prepared by sealing it together with 25-µm-sized spacers between 100-µm-thick electrically conductive polyester films, specifically in this case, "Hibeam" manufactured by Toray Industries, Inc. The change in the alignment of the layered clay mineral was studied by observing the intensity of the (001) reflection peak for the initial state and for the memory state (the state obtained by turning off the electric field after applying an electric field of 100 V–60 Hz).

Figure 100A:
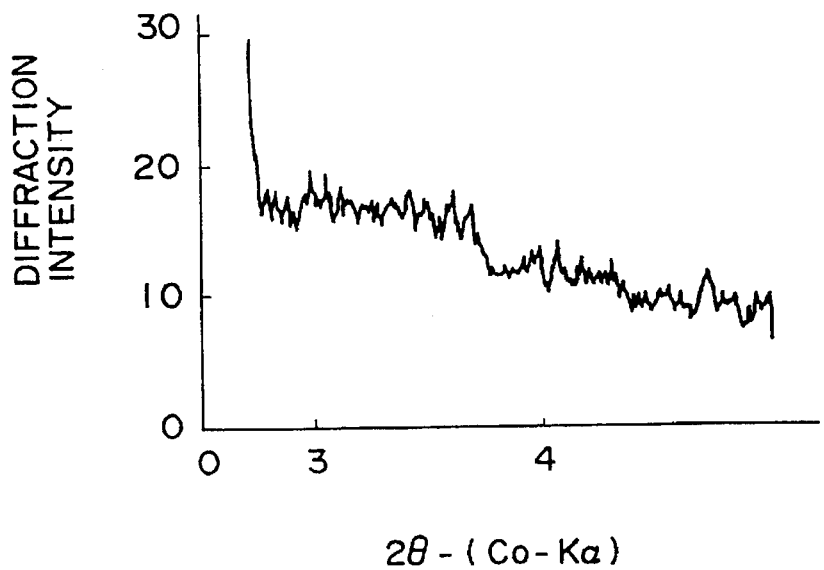
FIG. 100 is a diagram showing X-ray diffractograms for a liquid crystal composition.
Figure 100B:
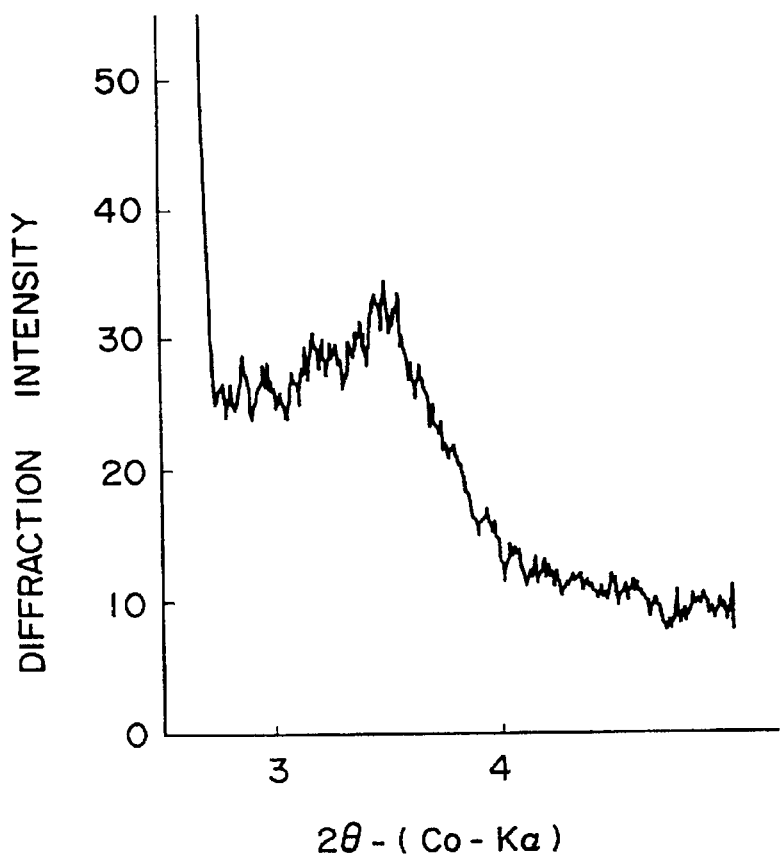

FIGS. 100 (a) and 100 (b) are each a part of the X-ray diffractogram obtained as a result of the transmission X-ray

TABLE 1

| | Concentration of layered clay mineral (Wt %) | Particle size of clay mineral (µm) | Response time (msec) | Applied voltage 0 V | Applied voltage 20 V | | Applied voltage 40 V | | Applied voltage 60 V | | Applied voltage 80 V | |
|---|---|---|---|---|---|---|---|---|---|---|---|---|
| | | | | | ON | OFF | ON | OFF | ON | OFF | ON | OFF |
| Example 1 | 1.1 | 1–5 | 12 | 26 | 72 | 52 | 85 | 51 | 85 | 53 | 86 | 62 |
| Example 2 | 2.0 | 1–5 | 13 | 24 | 59 | 42 | 68 | 49 | 73 | 53 | 75 | 55 |
| Example 3 | 3.0 | 1–5 | 14 | 13 | 46 | 33 | 61 | 45 | 65 | 48 | 69 | 52 |
| Example 4 | 4.0 | 1–5 | 18 | 13 | 42 | 32 | 53 | 42 | 61 | 49 | 66 | 54 |
| Example 6 | 1.0 | 1–2 | 17 | 21 | 51 | 30 | 86 | 66 | 91 | 69 | 92 | 68 | diffraction analysis. FIG. 100 (a) shows the X-ray diffraction pattern of the liquid crystal composition in its initial state (before applying an electric field), and FIG. 100 (b) shows the same of the liquid crystal composition in memory state, attained by turning off an electric field of 100 V–60 Hz after applying it to the composition. It can be seen that the intensity of the peak assigned to the (001) reflection of montmorillonite (the d-spacing thereof corresponds to the interlayer distance) is hardly discernible in the pattern for the initial state, but that it increases in the pattern corresponding to the memory state. It can be understood from these results that montmorillonite particles exhibit a particular alignment on applying an electric field by arranging themselves in such a manner that the layer planes thereof may be in parallel with the direction of the applied electric field. These results were in good agreement with the change in the particle alignment for the flat, plate-shaped particles as shown in FIG. 2.

EXAMPLE 2

The same process as that described in Example 1 was followed, except that 0.0252 g of laurylammonium montmorillonite (containing 0.0205 g of inorganic matter) were added to 1.0 g of 4-pentyl-4'-cyanobiphenyl liquid crystal. The same measurements were carried out on a cell filled with the resulting composition. The results are shown in Table 1. Results similar to those of Example 1 were obtained through the microscopic observation of the change in molecular alignment and the transmission X-ray diffraction of laurylammonium montmorillonite.

EXAMPLE 3

The same process as that described in Example 1 was conducted, except that 0.0382 g of laurylammonium montmorillonite (containing 0.0311 g of inorganic matter) were added to 1.0 g of 4-pentyl-4'-cyanobiphenyl liquid crystal. The same measurements were carried out on a cell filled with the resulting composition. The results are shown in Table 1. Results similar to those of Example 1 were obtained by the microscopic observation of the change in molecular alignment and the transmission X-ray diffraction of laurylammonium montmorillonite.

EXAMPLE 4

The same process as that described in Example 1 was followed, except that 0.0516 g of laurylammonium montmorillonite (containing 0.0421 g of inorganic matter) were added to 1.0 g of 4-pentyl-4'-cyanobiphenyl liquid crystal. The same measurements were carried out on a cell filled with the resulting composition. The results are shown in Table 1. Results similar to those of Example 1 were obtained through the microscopic observation of the change in molecular alignment and the transmission X-ray diffraction of laurylammonium montmorillonite.

EXAMPLE 5

The liquid crystal composition 16 prepared in Example 1 above was used to fabricate a light controlling element 26 as shown in FIG. 101. The light-controlling element 26 comprises a pair of glass sheets 27 each having an ITO electrode 28 (1 mm in thickness and 500×500 mm² in area, having a resistivity of 100 Ω/cm²) adhered to the entire surface of the inner plane thereof. The glass sheets 27 provided with the ITO electrodes yield a light transmittance of about 97%, and are therefore highly transparent. Polymer beads 12 μm in diameter were used as the spacers 29. Accordingly, the cell was fabricated with a gap of 12 μm. The liquid crystal composition 16 introduced into the cell was sealed using a sealing member 30 based on a 2-part curing silicone rubber. Although not shown in the figure, an electromagnetic actuator of a constitution described below was used as the actuator 31. The actuator comprises a coil wound around a core fixed on one end of one of the glass sheets 27, and permanent magnets placed in such a manner that they surround the core. Upon applying an AC electric field to the coil, the core functions as an electromagnet, and vibrates in the direction indicated with the arrow A in the figure in accordance with the attractive force and repulsive force that are exerted thereto through the reaction with the permanent magnet. The vibration of the coil exerts a shearing force onto the liquid crystal composition 16. Upon applying the electromagnetic actuator to the liquid crystal composition in the examples described below, all of the liquid crystal composition were found to recover their initial light-scattering state from their memory state instantaneously (in about 10 msec).

The light-controlling element 26 was measured with respect to light transmittance, response time and transmission X-ray diffraction in the same manner as described in Example 1. Results similar to those described in Example 1 were obtained.

In the above measurement of light transmittance, the light-controlling element was maintained in its memory state by releasing it from the voltage of 60 V that had been applied thereto, and a shearing force was exerted thereto by applying an alternating electric field to the aforementioned electromagnetic actuator for a duration of 50 msec at a frequency of 60 Hz. The liquid crystal composition was found to be released almost instantaneously from its memory state.

EXAMPLE 6

Synthesis of 4-(4-(N-phthalimido)butoxy)-4'-cyanobiphenyl

A 10.5-g (54 mmol) portion of 4-cyano-4'-hydroxybiphenyl was charged inside a 250-ml flask together with 18.8 g (136 mmol) of potassium carbonate anhydride, and 137 ml of a mixed solvent comprising a 125:12 mixture of acetone and dimethylsulfoxide was added thereto. The resulting mixture was heated to a refluxing temperature under gaseous nitrogen, and was stirred for about 2 hours and 20 minutes. Then, after adding 15.2 g (54 mmol) of N-(4-bromobutyl)phthalimide to the resulting product, stirring was continued for about 17 hours at the refluxing temperature. The reaction mixture thus obtained was charged into 500 ml of water, and after stirring for a certain duration of time, the insoluble portion was recovered by suction filtration. After drying the product thus obtained as a powder slightly yellow in color, it was dissolved in chloroform, and a purified 4-(4-(N-phthalimido) butoxy)-4'-cyanobiphenyl was obtained therefrom as a white powder. The separation and purification of the desired product was carried out by a column method using silica gel as the packing material and chloroform as the solvent. The white powder product was recrystallized from a 300:200 mixed solvent of ethanol and chloroform to obtain 14.1 g of white acicular crystals at a yield of 66.0%.

(2) Synthesis of 4-(4-aminobutoxy)-4'-cyanobiphenyl

A 13.9-g portion of 4-(4-(N-phthalimido)butoxy)-4'-cyanobiphenyl was charged in a 250-ml flask, and was dissolved with 120 ml of tetrahydrofuran. After heating the resulting solution to 50° C., 11.08 g (221 mmol) of hydrazine monohydrate and 50 ml of ethanol were added therein to stir the solution for about 4 hours at the refluxing temperature. The solution was cooled to room temperature, and 40 ml of concentrated hydrochloric acid were gradually added therein. The reaction mixture was extracted with a 300-ml portion of chloroform and an aqueous sodium hydroxide solution (containing 50 g of sodium hydroxide in 120 ml of water), and the organic phase was washed three times with 300 ml of water. The organic phase was dried over anhydrous sodium sulfate, and after filtering off the desiccant, the solvent was evaporated off using a rotary evaporator to obtain a yellow-colored viscous liquid. The resulting liquid was subjected to separation and purification by means of column method using silica gel as the packing material and a 1:1 mixed solvent of chloroform and ethanol to finally obtain 5.57 g of the desired 4-(4-aminobutoxy)-4'-cyanobiphenyl as a pale yellow solid at a yield of 60.0%.

(3) Synthesis of Organic Montmorillonite

A 6.31-g portion of high-purity Na-montmorillonite (having an ion-exchange capacity of 119 meq/100 g) obtained from bentonite of Yamagata prefecture, Japan, was dispersed in 400 ml of water. Separately, an ammonium salt was prepared by adding 0.836 g of concentrated hydrochloric acid to a 2.20-g portion of 4-(4-aminobutoxy)-4'-cyanobiphenyl. A part of the ammonium salt was found to crystallize and yield a precipitate, but the precipitate was found thereafter to be completely dissolved in 10 ml of water. A water dispersion of Na-montmorillonite above was added to this aqueous solution while vigorously stirring the dispersion. An agglomerate was found to generate in the product, but stirring was continued for another 20 minutes.

The agglomerate was recovered by filtration upon completion of the stirring, and was freeze-dried after washing it once with ethanol and three times with hot water. The resulting product was further dried in a vacuum at 80° C. for 5 hours to obtain a powder of organic montmorillonite containing cyanobiphenyloxybutylammonium. The resulting organic montmorillonite is referred to hereinafter as "cyanobiphenyloxybutylammonium montmorillonite".

(4) Preparation of Liquid Crystal Composition

A 1.0-g portion of 4-pentyl-4'-cyanobiphenyl liquid crystal was dissolved in 1 ml of dimethylsulfoxide to obtain a uniform solution. Separately, 0.0128 g of cyanobiphenyloxybutylammonium montmorillonite (containing 0.0096 g of inorganic matter) was uniformly dispersed in 2 ml of dimethylacetamide. The resulting dispersion was uniformly mixed with the solution. Dimethylacetamide was removed from the mixed dispersion through evaporation by heating the dispersion at a temperature in the range of from 50° to 60° C. in a vacuum. By sufficiently stirring and mixing the product, the desired liquid crystal composition was obtained as a white paste.

Similar to the process described in Example 1, the liquid crystal composition thus prepared was subjected to observation under a polarization microscope, and a liquid crystal cell was fabricated therefrom. The cell was then measured with respect to light transmittance, response time, and transmission X-ray diffraction in the same manner as those in Example 1. The results are given in Table 1. Concerning the microscopic observation of the change in the molecular alignment and the transmission X-ray diffraction of cyanobiphenyloxybutylammonium montmorillonite, results similar to those obtained in Example 1 were obtained.

EXAMPLE 7

The same process as that described in Example 6 was followed, except that cyanobiphenyloxybutylammonium montmorillonite (containing 0.0190 g of inorganic matter) was used at a quantity of 0.0250 g. The same measurements as those conducted in Example 6 were carried out on a cell filled with the resulting composition. The results are shown in Table 2. Results similar to those of Example 1 were obtained through the microscopic observation of the change in the molecular alignment and the transmission X-ray diffraction of cyanobiphenyloxybutylammonium montmorillonite.

EXAMPLE 8

The same process as that described in Example 6 was followed, except that cyanobiphenyloxybutylammonium montmorillonite (containing 0.0288 g of inorganic matter) was used at a quantity of 0.0382 g. The same measurements as those conducted in Example 6 were carried out on a cell filled with the resulting composition. The

TABLE 2

| | Concentration of layered clay mineral | Particle size of clay mineral | Response time | Applied voltage | Applied voltage 20 V | | Applied voltage 40 V | | Applied voltage 60 V | | Applied voltage 80 V | | Memory state released after applying voltage |
|---|---|---|---|---|---|---|---|---|---|---|---|---|---|
| | (Wt %) | (μm) | (msec) | 0 V | ON | OFF | ON | OFF | ON | OFF | ON | OFF | of 60 V |
| Example 7 | 1.9 | 1–2 | 19 | 10 | 25 | 14 | 75 | 53 | 87 | 64 | 91 | 65 | 10 |
| Example 8 | 2.8 | 1–2 | 38 | 10 | 20 | 13 | 56 | 36 | 80 | 59 | 86 | 63 | 8 |
| Example 9 | 3.8 | 1–2 | 65 | 6 | 7 | 6 | 11 | 8 | 24 | 14 | 34 | 18 | 7 |
| Comparative Example 1 | 0 | — | <10 | 98 | 99 | 98 | 99 | 98 | 99 | 98 | 99 | 98 | 98 |
| Comparative Example 2 | — | — | 0.87 | 5 | 22 | 5 | 60 | 5 | 70 | 5 | 72 | 5 | — |

TABLE 2-continued

| | | | Light transmittance of cell (%) | | | | | | | | |
|---|---|---|---|---|---|---|---|---|---|---|---|
| Concentration of layered clay mineral | Particle size of clay mineral | Response time | Applied voltage | Applied voltage 20 V | | Applied voltage 40 V | | Applied voltage 60 V | | Applied voltage 80 V | | Memory state released after applying voltage |
| (Wt %) | (μm) | (msec) | 0 V | ON | OFF | ON | OFF | ON | OFF | ON | OFF | of 60 V |
| Comparative Example 3 | — | — | 1700 | 90% or higher light trasmittance obtained upon applying a high frequency (1 KHz) electric field; 5% or lower light trasmittance upon applying a low frequency (0.01 Hz) electric field; stable in every state even after turning OFF the electric field. | | | | | | | | | results are shown in Table 2. Results similar to those of Example 1 were obtained through the microscopic observation of the change in the molecular alignment and the transmission X-ray diffraction of cyanobiphenyloxybutylammonium montmorillonite.

EXAMPLE 9

The same process as that described in Example 6 was followed, except that cyanobiphenyloxybutylammonium montmorillonite (containing 0.0400 g of inorganic matter) was used at a quantity of 0.0531 g. The same measurements as those conducted in Example 6 were carried out on a cell filled with the resulting composition. The results are shown in Table 2. Results similar to those of Example 1 were obtained through the microscopic observation of the change in the molecular alignment and the transmission X-ray diffraction of cyanobiphenyloxybutylammonium montmorillonite.

COMPARATIVE EXAMPLE 1

A liquid crystal cell was fabricated in the same manner as in Example 1, except that 4-pentyt-4'-cyanobiphenyl liquid crystal was sealed alone in the cell. The same measurements as those conducted in Example 1 were carried out on the resulting cell. The results are shown in Table 2.

COMPARATIVE EXAMPLE 2

Cataloged data for liquid crystal light controlling sheet "PDLC Umfilm" (having a cell gap of 22 μm) manufactured by Japan Sheet Glass Co., Ltd. are given in Table 2.

COMPARATIVE EXAMPLE 3

Literature on the low-molecular liquid crystal/high-molecular liquid crystal composite given in Kajiyama et al., "Functional liquid crystal polymers and prospects on their applications", *Kino Zairyo* (Functional Materials), Vol. 112, No. 4 (1992) p. 28 are cited and given in Table 2.

EVALUATION OF THE COMPOSITIONS OBTAINED IN EXAMPLES 1 TO 9, AND COMPARATIVE EXAMPLES 1 TO 3

Tables 1 and 2 read that each of the liquid crystal compositions obtained in Examples 1 to 9 exhibits an opaque light scattering state at its initial state in which 0 voltage is applied. However, a transparent state can be realized on the liquid crystal compositions by applying a predetermined electric field, and even after they are released from the electric field, a transparent state well distinguished from the light scattering state is maintained; i.e., they exhibit a memory function. Such features are clearly understood by comparing the characteristics with those observed in Comparative Example 1.

As compared with the case in which a liquid crystal is used alone as in Comparative Example 1, quick response which is less impaired in an applied electric field can be obtained with the liquid crystal compositions of Examples 1 to 9. Moreover, a far quicker response is obtained with the liquid crystal compositions according to the present invention as compared with the low-molecular liquid crystal/high-molecular liquid crystal composite of Comparative Example 3. Each of the compositions obtained in Examples 1 to 9 recovers its initial state corresponding to that shown in FIG. 1 (1) on applying externally an impact (shear), or that corresponding to the state shown in FIG. 1 (5) on lowering the internal temperature after once elevating it to a level of the isotropic transition point or higher.

In contrast to the compositions of Examples 1 to 9, liquid crystal of Comparative Example 1 does not exhibit a light scattering state, and remains transparent irrespective of whether an electric field is applied or not. In Comparative Example 2, the transparent state generated by applying an electric field cannot be maintained after the material is released from the electric field. It can be understood that the sheet has no memory effect. The composite of Comparative Example 3 exhibits a sufficiently high memory function, but the response time thereof is excessively long.

Examples According to the Third Aspect of the Invention

EXAMPLE 10

Figure 76:
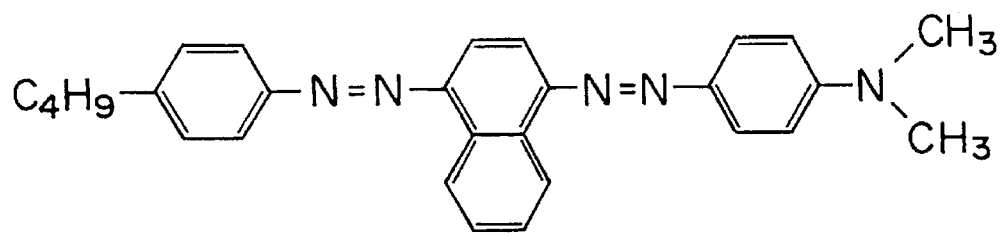
Figure 77:
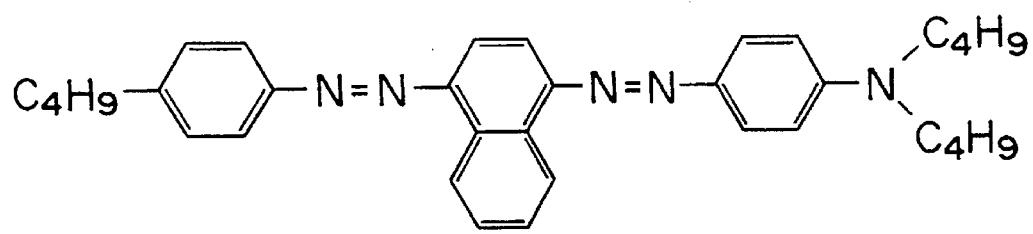
Figure 78:
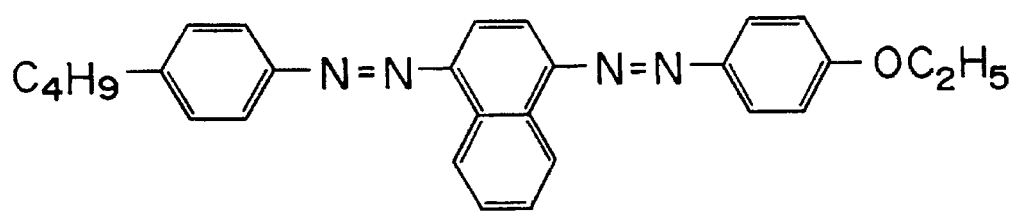
Figure 79:
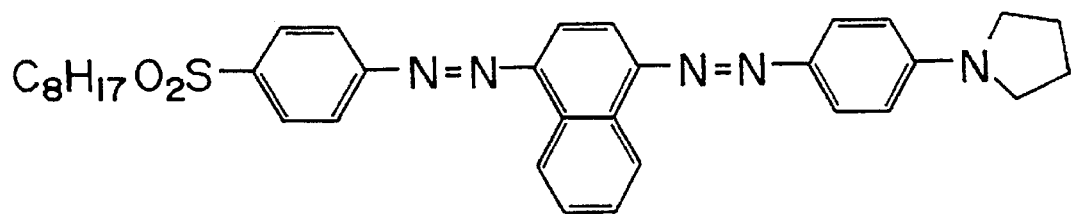
Figure 80:
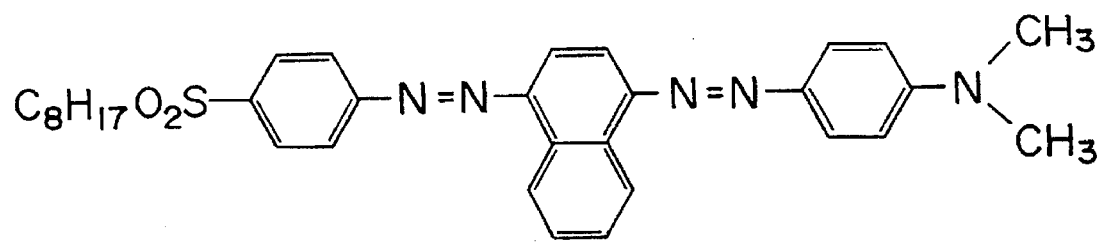
Figure 81:
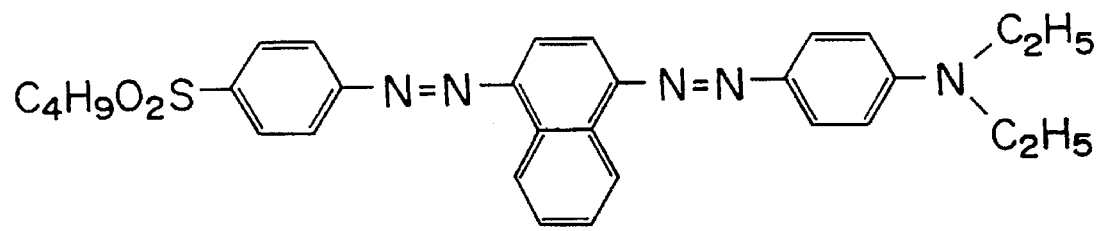
Figure 82:
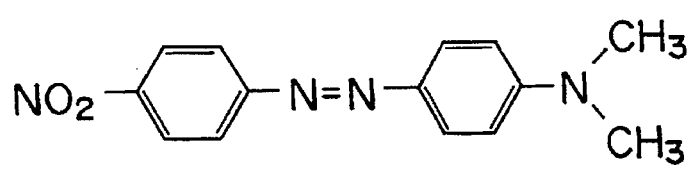
Figure 83:
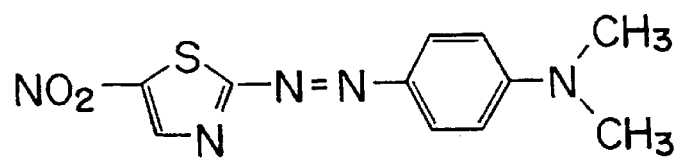
Figure 84:
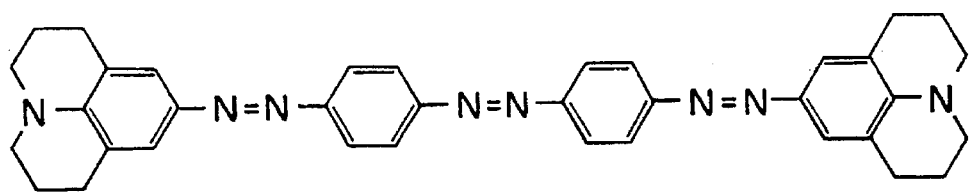
Figure 85:
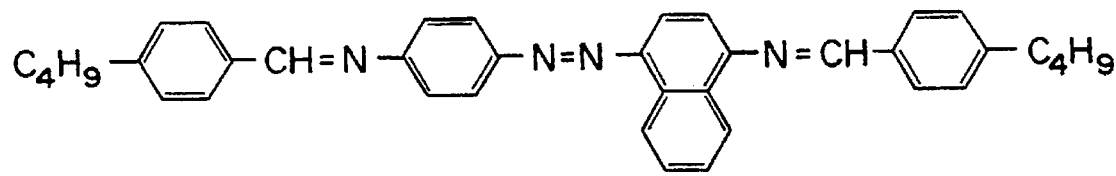
Figure 86:
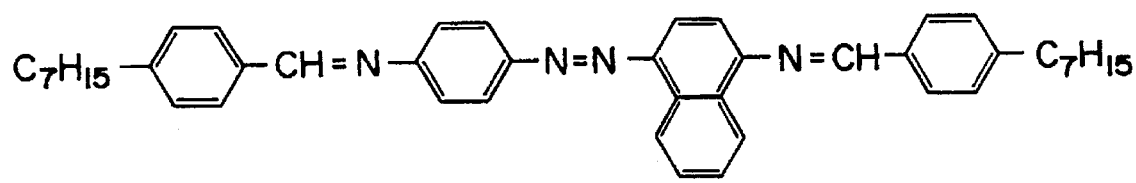
Figure 87:
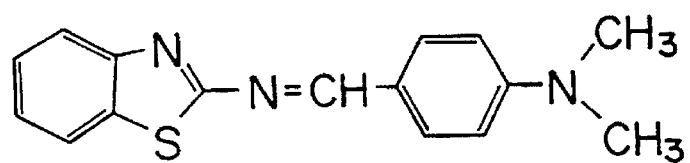
Figure 88:
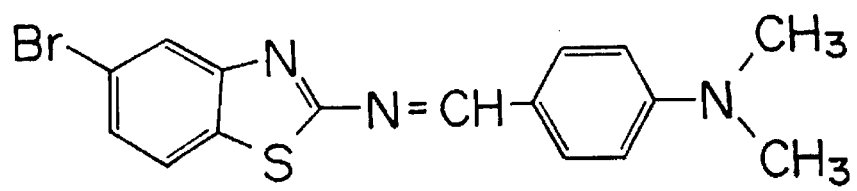

A liquid crystal composition was prepared by adding 0.0710 g of laurylammonium montmorillonite (containing 0.0547 g of inorganic matter) and 0.0100 g of a reddish purple azo-based dichromatic dye (having a maximum absorption wavelength of 533 nm) expressed by a structural formula shown in FIG. 76.

The dispersed particle size of laurylammonium montmorillonite in the liquid crystal composition thus obtained was measured in a manner similar to that employed in Example 1. A liquid crystal cell was fabricated using the composition in the same manner as in Example 1 to measure the ratio of light transmittance upon applying an electric field of 50 V–60 Hz to the cell in the initial state. This ratio is simply referred to hereinafter as "contrast". The results are given in Table 3.

TABLE 3

|  | Concentration of layered clay mineral (Wt %) | Particle size of clay mineral (μm) | Concentration of dichromatic dye (Wt %) | Contrast |
|---|---|---|---|---|
| Example 10 | 5.1 | <10 | 0.0093 | 7.3 |
| Example 11 | 5.0 | <10 | 0.0270 | 6.8 |
| Comparative Example 4 | 5.1 | <10 | 0 | 4.0 |

EXAMPLE 11

The same process as that carried out in Example 10 was followed, except that the reddish purple azo-based dichromatic dye (having a maximum absorption wavelength of 533 nm) above was added at a quantity of 0.0300 g. The dispersed particle size of laurylammonium montmorillonite and contrast were measured. The results are given in Table 3.

COMPARATIVE EXAMPLE 4

The same process as that carried out in Example 10 was followed, except that no dichromatic dyes were added. The dispersed particle size of laurylammonium montmorillonite and contrast were measured. The results are given in Table 3.

EVALUATION OF THE COMPOSITIONS OBTAINED IN EXAMPLES 10 AND 11, AND COMPARATIVE EXAMPLE 4

From Table 3, it can be seen that the contrast is improved for Examples 10 and 11 as compared with that obtained in Comparative Example 4. The visual contrast observed with the naked eye in the Examples 10 and 11 was improved to a value not lower than those given in Table 3.

Examples According to the Fourth and Fifth Aspects of the Invention

EXAMPLE 12

(1) Preparation of Organic-Compatible Montmorillonite

A 6.31-g portion of high-purity Na-montmorillonite (having an ion-exchange capacity of 119 meq/100 g) obtained from bentonite of Yamagata prefecture, Japan, was dispersed in 400 ml of water. Separately, an ammonium salt was prepared by adding 0.836 g of concentrated hydrochloric acid to a solution obtained by dissolving 4-(4-aminobutoxy)-4'-cyanobiphenyl in 50 ml of ethanol. A part of the ammonium salt was found to crystallize and yield a precipitate, but the precipitate was found to be completely dissolved in 10 ml of water.

A water dispersion of Na-montmorillonite above was added while the dispersion was vigorously stirred. An agglomerate was found to form in the product, but stirring was continued for another 20 minutes. The agglomerate was recovered by filtration upon completion of the stirring, and was freeze-dried after washing it once with ethanol and twice with hot water. The resulting product was further dried in a vacuum at 80° C. for 5 hours to obtain a powder of organic montmorillonite containing cyanobiphenyloxybutylammonium. The resulting organic montmorillonite is referred to hereinafter as "cyanobiphenyloxybutylammonium montmorillonite".

(2) Preparation of Liquid Crystal Composition

A 1.0-g portion of 4-pentyl-4'-cyanobiphenyl liquid crystal (which undergoes phase transition from isotropic phase to liquid crystalline phase at a temperature of 35° C.) was dissolved into 1 ml of dimethylsulfoxide to obtain a uniform solution. Separately, 0.0250 g of cyanobiphenyloxybutylammonium montmorillonite (containing 0.0190 g of inorganic matter) were uniformly dissolved in 2 ml of dimethylsulfoxide. The resulting solutions were mixed uniformly. The solvent was removed from the mixed solution through evaporation by heating the solution at a temperature in the range of from 50° to 60° C. under vacuum. By sufficiently stirring and mixing the product, the desired liquid crystal composition was obtained as a white paste.

(3) Microscopic Observation Using Crossed Nicol Prisms

The approximate particle size of the powder of cyanobiphenyloxybutylammonium montmorillonite dispersed in the isotropic liquid crystal composition obtained above was measured by microscopic observation using crossed nicol prisms. A polarization microscope "Model BHS-P" manufactured by Olympus Optical Co. Ltd. was used for the measurement. The approximate dispersed particle size was found to be 2 μm or less.

(4) Fabrication of a Recording Element

As shown in FIG. 5, a recording element was fabricated by using the liquid crystal composition above. ITO (indium tin oxide) was attached to glass sheets 8 to use the sheets as cell plates with the clear electrodes 7 adhered thereto. Polymer beads with a diameter of 12 μm were used as the spacers 9. A light-reflective film was tightly adhered to one of the glass sheets 8 having ITO, and the liquid crystal composition 11 was further mounted thereon. After fixing spacers 9 on the first glass sheet with ITO, the other glass sheet 8 having ITO was placed on the liquid crystal composition 11 and pressure welded to the first glass sheet. A laser head 12 was provided as means for recording information.

(5) Recording of Information

Information was recorded by using a laser head in the following manner. First, the temperature of the atmosphere was maintained at 33° C., i.e., a temperature which is lower than the isotropic phase transition point of the liquid crystal (35° C.) by 2° C. Thus, an AC electric field of 80 V–60 Hz was applied to the cell 10 for a duration of 0.5 sec to bring the liquid crystal composition into a recordable state.

Then, a helium-neon laser was operated at a wavelength of 632.8 nm and at an output of 15 mW, and the laser radiation emitted from the laser head 12 was condensed to a beam having a spot diameter of about 20 μm by using a lens. The laser beam was irradiated to the cell 10 for a duration of 0.5 seconds to write pieces of information in the form of spots. The spots in the cell were observed using a microscope with crossed nicol prisms. The beam-irradiated portions were each found to yield an area of about 20 μm in diameter with a distinguished light-transmitting state, while the surroundings exhibited another type of recordable light-transmitting state. The cell 10 was allowed to stand as it is in a room for a duration of about 90 days. The spot portion and the surroundings were found to be unchanged after the duration. Thus, the spots were stably retained.

On applying an electric field to the cell 10, the spots recovered the same recordable light-transmitting state as that of the surroundings. Thus, the recorded pieces of information were erased.

The response time required for erasing information was measured by using a super-high sensitivity instantaneous multiphotometer system "IMUC-7000" manufactured by Otsuka Denshi K. K. The measuring conditions were set at a sampling time of 10 ms, an interval of 0 ms, and a measuring wavelength of 572 nm. A voltage of 80 V–60 Hz was applied instantaneously, and the change in output from the multiplier was measured with increasing duration of time. The response time corresponds to the time required for the change in output from 10% to 90%. As a result, the information was found to be erasable at a high speed; the response time was found to be about 20 ms or less.

Figure 102:
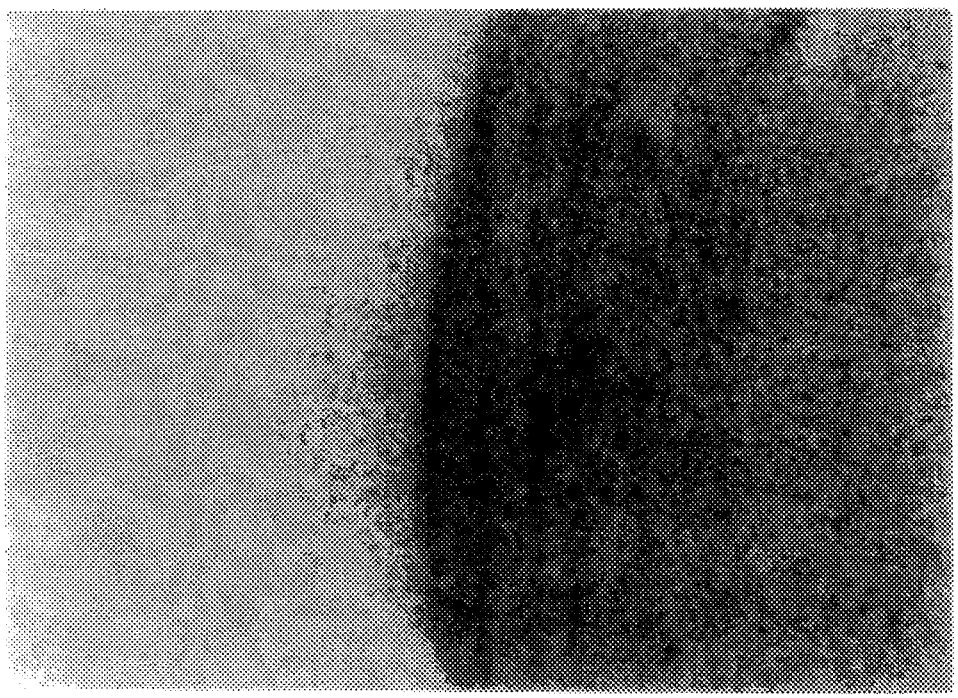
FIG. 102 is a micrograph of a recording medium cell taken using crossed nicol prisms showing information recorded in spots.

The same operation as that described in the foregoing was repeated to write spots of about 8 mm in diameter onto the cell 10. The spots were observed with a microscope having crossed nicol prisms at a magnification of 40 times. The micrograph is given in FIG. 102. It can be seen that the dark portion defined by an arc boundary on the right-hand side of the figure corresponds to a part of the spot portion, and is clearly distinguished from the light portion on the left-hand side corresponding to the surroundings in a recordable state.

EXAMPLE 13

A liquid crystal composition was prepared in the same manner as in Example 12 to obtain a recording element.

In the recording element, an α-area in which information is recordable by means of a laser head and erasable by applying an electric field was defined in a part of the recording medium cell. Similarly, a β-area in which electric field is simply applicable and releasable was set in the same cell. An operation consisting of the following steps 1 to 6 was applied to the recording medium cell.

Step 1: Setting both of the α-and β-areas to an initial state corresponding to the state A indicated in FIG. 3 (A).

Step 2: Realizing a light-transmitting state corresponding to state B shown in FIG. 3 by applying a voltage of 80 V to both of the α- and β-areas.

Step 3: Turning off the applied voltage to both of the α- and β-areas to attain a recordable state C as shown in FIG. 3.

Step 4: Irradiating a laser beam to the (α-area alone, and recovering a light-transmitting state (isotropic state) D as shown in FIG. 3 by heating.

Step 5: Cutting off the irradiation of a laser beam to the α-area to attain a recording state E as shown in FIG. 3.

Step 6: After applying a voltage of 80 V to both of the α-and β-areas, turning off the applied voltage to recover the recordable state C as shown in FIG. 3.

The light transmittance for each of the α-and β-areas in each step was measured. The results are shown below in relative values by taking the light transmittance of the α-area in step 4 as 100%.

Step 1: 19% for both α- and β-areas.
Step 2: 91% for both α- and β-areas.
Step 3: 65% for both α- and β-areas.
Step 4: 100% for α-area and 65% for β-area.
Step 5: 33% for α-area and 65% for β-area.
Step 6: 65% for both α- and β-areas.

Examples According to the Sixth and Seventh Aspects of the Invention

EXAMPLE 14

(1) Preparation of Liquid Crystal Composition

A liquid crystal composition was prepared by dispersing 0.0147 g of laurylammonium montmorillonite (containing 0.0113 g of inorganic matter) in 1.00 g of 4-pentyloxy-4'-cyanobiphenyl liquid crystal (which undergoes phase transition on lowering at a rate of 10° C./min from isotropic phase to liquid crystalline phase and to crystalline phase at a temperature sequence of isotropic phase, 67° C., liquid crystalline phase, 48° C., crystalline phase).

(2) Measurement of Particle Size Diameter of Clay Mineral

The particle size of laurylammonium montmorillonite dispersed in the liquid crystal composition was measured in the same manner as in Example 1. The results are shown in Table 4.

(3) Fabrication of a Liquid Crystal Cell

The liquid crystal composition above was mounted on a surface-untreated slide glass substrate, and another surface-untreated slide glass was pressed tightly thereto by incorporating 13 μm thick spacers.

(4) Measurement of Light Transmittance

TABLE 4

| | Concentration of layered clay mineral (Wt %) | Particle size of clay mineral (μm) | Light transmittance (%) | | |
|---|---|---|---|---|---|
| | | | Isotropic phase | Liquid crystalline phase | Crystalline phase |
| Example 14 | 1.1 | <10 | 100 | 37.7 | 87.9 |
| Example 15 | 3.1 | <10 | 97.1 | 6.5 | 51.0 |
| Example 16 | 5.1 | <10 | 95.1 | 9.4 | 46.9 |
| Example 17 | 7.0 | <10 | 88.1 | 3.3 | 29.4 |
| Comparative Example 5 | 0 | — | 98.3 | 95.9 | 92.1 |

Light transmittance was measured in the same manner as in Example 1 by using the same equipment system as that used in Example 1, except for the use of a hot plate. The light transmittance of the cell was measured in each stage of isotropic phase, liquid crystalline phase, and crystalline phase by heating the cell using a hot plate and allowing it to cool down naturally. For crystallization, 4-pentyloxy-4'-cyanobiphenyl crystals were brought into contact with the liquid crystal composition from the sides of the cell to provide the crystal nuclei. The results are given in Table 4.

EXAMPLE 15

The same process as that employed in Example 14 was followed, except that a liquid crystal composition was used which had been obtained by dispersing 0.0423 g (containing 0.0326 g of inorganic matter) of laurylammonium montmorillonite in 1.00 g of 4-pentyloxy-4'-cyanobiphenyl. The particle diameter of the clay mineral and light transmittance were measured in the same manner as in Example 14. The results are given in Table 4.

EXAMPLE 16

The same process as that employed in Example 14 was followed, except for using a liquid crystal composition obtained by dispersing 0.0710 g (containing 0.0547 g of inorganic matter) of laurylammonium montmorillonite in 1.00 g of 4-pentyloxy-4'-cyanobiphenyl. The particle diameter of the clay mineral and light transmittance were measured in the same manner as in Example 14. The results are given in Table 4.

EXAMPLE 17

The same process was followed as that employed in Example 14, except that a liquid crystal composition was used which had been obtained by dispersing 0.100 g (containing 0.0771 g of inorganic matter) of laurylammonium montmorillonite in 1.00 g of 4-pentyloxy-4'-cyanobiphenyl. The particle diameter of the clay mineral and light transmittance were measured in the same manner as in Example 14. The results are given in Table 4.

COMPARATIVE EXAMPLE 5

The same process was followed as that carried out in Example 14, except that 4-pentyloxy-4'-cyanobiphenyl was used alone. Light transmittance was measured in the same manner as in Example 14. The results are given in Table 4.

EVALUATION OF THE COMPOSITIONS OBTAINED IN EXAMPLES 14 TO 17, AND COMPARATIVE EXAMPLE 5

From Table 4, it can be seen that all of the compositions according to the Examples exhibit a characteristic thermo-optic effect in which a highest transparency is attained at the high temperature phase (isotropic phase), a most opaque appearance at the intermediate temperature phase (liquid crystalline phase), and a semi-transparent state at the low-temperature phase (crystalline phase). This is in clear contrast to that of a Comparative Example. It can be seen therefrom that the liquid crystal compositions according to the present invention are usable as novel light controlling materials which are capable of increasing transparency with decreasing temperature in a temperature range between the liquid crystalline phase and the crystalline phase. Moreover, because the temperature range between the liquid crystalline phase and the crystalline phase can be set relatively arbitrarily by selecting the liquid crystal material, the liquid crystal compositions according to the present invention can be used as a light controlling material for temperature controllers as it is capable of maintaining the temperature of a room and the like at a desired temperature range.

The liquid crystal compositions according to the present invention can be used also as a light controlling material which is capable of decreasing transparency with a lowering in the temperature in a range between the isotropic phase and liquid crystalline phase.

EXAMPLE 18

(1) Preparation of Organic Montmorillonite

A 200-g portion of a high-purity sodium-montmorillonite (Na-montmorillonite) (having an ion-exchange capacity of 119 meq/100 g) obtained from bentonite of Yamagata prefecture, Japan, was dispersed in 3,500 ml of water, and was heated to 80° C. Separately, while heating and stirring, 48.8 g (262 mmol) of laurylamine were completely dissolved in water and 31.0 g of concentrated hydrochloric acid. The resulting solution of ammonium salt was added to the aqueous dispersion of Na-montmorillonite while vigorously stirring the mixture to find an agglomerate forming in the dispersion. Stirring was further continued for a duration of 30 minutes.

The agglomerate was recovered by filtration upon completion of the stirring, and was freeze-dried after washing it once with ethanol and three times with hot water. The resulting product was further dried under vacuum at 80° C. to obtain a powder of organic-compatible montmorillonite containing laurylammonium.

(2) Preparation of Liquid Crystal Composition

A 1.0-g portion of 4-pentyl-4'-cyanobiphenyl liquid crystal were uniformly dispersed in 2 ml of dimethylacetamide. Dimethylacetamide was removed from the mixed dispersion through evaporation by heating the dispersion at a temperature in a range of from 50° to 60° C. under vacuum. The size of the resulting composite was reduced to obtain a liquid crystal composition in the form of a powder.

(3) Microscopic Observation Using Crossed Nicol Prisms

A polarization microscope "Model BHS-P" manufactured by Olympus Optical Co. Ltd. and crossed nicol prisms was used for the measurement. The diameter of the dispersed particle was found to be 5 µm or less.

(4) Fabrication of a Light Shutter

Figure 103:
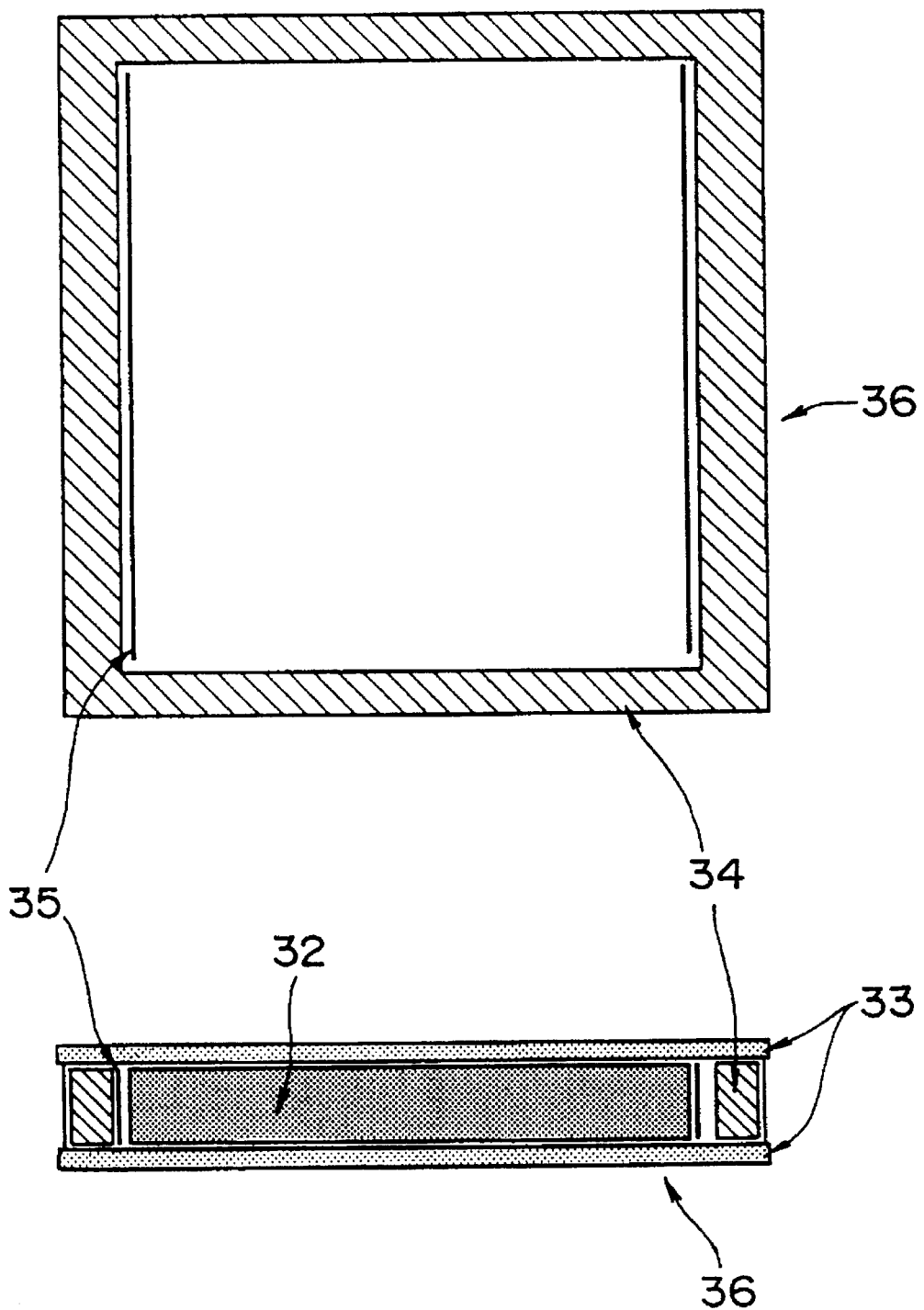
FIG. 103 is a scheme showing a constitution of a light shutter cell.

As shown in FIG. 103, a liquid crystal composition 32 was mounted on a transparent square glass sheet 33 (0.5×0.5 m² in area), and was densely surrounded by 13-µm-thick spacers 34. Among the spacers 34, the inner side face of those disposed on two opposing sides of the square glass sheet was covered previously with a thin film of a crystal nucleating agent 35 comprising pentyloxycyanoterphenyl. Another glass sheet 33 of the same shape and size as that above was placed on the liquid crystal composition, and pressed tightly to complete the structure into a light-shutter cell 36.

(5) Test of Light Transmittance

The light-shutter cell thus obtained was confirmed as exhibiting a liquid crystalline phase at atmosphere pressure and a temperature of 48° C. Thus, direct incident sun light was found to be shielded by the cell exhibiting an almost complete light scattering state. On lowering the atmospheric temperature to 25° C., crystallization was observed to proceed from the portion brought into contact with the crystal nucleating agent and crystallization was completed in about 2 minutes. A semi-transparent state resulted on the light-shutter cell to allow direct incident sun light to be transmitted.

(6) Measurement of Light Transmittance

The same measuring system as that illustrated in FIG. 97 was employed to measure the light transmittance of the light-shutter cell above.

The light-shutter cell in liquid crystalline phase was found to transmit 6.5% of the incident light, and that in crystalline phase was found to transmit 51.0% of the same.

For reference, the liquid crystal composition was forcibly heated until it acquired an isotropic phase. The light transmittance of the liquid crystal composition in this phase was found to be 97.1% (with respect to incident light).

This application is based on Japanese Patent Application No. 102208/1994, 131180/1994, 166313/1994, and 166314/1994 filed Apr. 14, 1994, May 19, 1994, Jun. 24, 1994, and Jun. 24, 1994, respectively, incorporated herein by reference.

We claim:

1. A liquid crystal composition comprising a non-polymeric liquid crystal and a second substance dispersed therein, the second substance having affinity for the liquid crystal and being composed of particles having a particle size of from 0.1 to 20 µm and an aspect ratio of 2 or more, said particles being present in said composition in an amount to form domains in the liquid crystal.

2. A liquid crystal composition as claimed in claim 1, wherein the particles of the second substance have a particle size of from 1 to 5 µm in size.

3. A liquid crystal composition as claimed in claim 1, wherein the particles of the second substance have an aspect ratio of 5 or more.

4. A liquid crystal composition as claimed in claim 1, wherein the particles of the second substance are present in an amount of from 1 to 10 parts by weight with respect to 100 parts by weight of the liquid crystal.

5. A liquid crystal composition comprising an electric field sensitive non-polymeric liquid crystal having a positive dielectric anisotropy and flat plate-shaped particles dispersed therein having a diameter of from 0.1 to 20 µm and affinity for the liquid crystal, said particles being present in an amount to form liquid crystal domains.

6. A liquid crystal composition comprising an electric field sensitive non-polymeric liquid crystal having a positive dielectric anisotropy, a dichromatic dye, and flat plate-shaped particles having a diameter of from 0.1 to 20 µm and affinity for the liquid crystal said particles being present in the liquid crystal in an amount to form liquid crystal domains.

7. A liquid crystal composition as claimed in claim 1, wherein the liquid crystal used therein undergoes phase transition between a liquid crystalline state and an isotropic state in a temperature range of from −100° C. −60° C.

8. A liquid crystal composition as claimed in claim 1, wherein the second substance has an electric field sensitivity.

9. A liquid crystal composition as claimed in claim 1, wherein the second substance is a layered clay mineral rendered organic-compatible.

10. A liquid crystal composition as claimed in claim 5, wherein the flat plate-shaped particles are those of layered clay minerals rendered organic-compatible.

11. A liquid crystal composition comprising a non-polymeric liquid crystal and flat plate-shaped particles having a diameter of from 0.1 to 20 µm, said particles being dispersed in the liquid crystal at such a degree of density that domains are formed and that light scattering attributed to the flat plate-shaped particles does not substantially influence light transmittance of the liquid crystal composition.

12. A liquid crystal composition as claimed in claim 11, wherein the liquid crystal used therein undergoes phase transition between −10° C. and 60° C.

* * * * *

UNITED STATES PATENT AND TRADEMARK OFFICE
CERTIFICATE OF CORRECTION

PATENT NO. : 5,645,758
DATED : JULY 8, 1997
INVENTOR(S) : MASAYA KAWASUMI ET AL

It is certified that error appears in the above-identified patent and that said Letters Patent is hereby corrected as shown below:

Column 42, line 7, "-100°C.-60°C." should read -- -10°C - 60°C.--.

Signed and Sealed this

Ninth Day of June, 1998

Attest:

BRUCE LEHMAN

*Attesting Officer*      *Commissioner of Patents and Trademarks*